US012581228B2

(12) United States Patent
Newlove

(10) Patent No.: US 12,581,228 B2
(45) Date of Patent: Mar. 17, 2026

(54) FLAT PANEL LOUDSPEAKER WITH OVERHANGING PANEL AND METHOD OF INSTALLATION THEREOF

(71) Applicant: Amina Technologies Limited, Huntingdon (GB)

(72) Inventor: Richard Mark Newlove, Huntingdon (GB)

(73) Assignee: Amina Technologies Limited, Huntingdon (GB)

( * ) Notice: Subject to any disclaimer, the term of this patent is extended or adjusted under 35 U.S.C. 154(b) by 188 days.

(21) Appl. No.: 18/511,613

(22) Filed: Nov. 16, 2023

(65) Prior Publication Data

US 2024/0171902 A1 May 23, 2024

(30) Foreign Application Priority Data

Nov. 17, 2022 (GB) ..................................... 2217215

(51) Int. Cl.
*H04R 1/28* (2006.01)
*H04R 1/02* (2006.01)
(Continued)

(52) U.S. Cl.
CPC ........... *H04R 1/2811* (2013.01); *H04R 1/025* (2013.01); *H04R 7/04* (2013.01); *H04R 7/045* (2013.01);
(Continued)

(58) Field of Classification Search
CPC .......... H04R 1/025; H04R 7/04; H04R 7/045; H04R 9/06; H04R 1/2811; H04R 2201/021; H04R 2400/11; H04R 2440/01
See application file for complete search history.

(56) References Cited

U.S. PATENT DOCUMENTS 4,567,327 A 1/1986 Goossens et al.
4,860,369 A * 8/1989 Koshimura .............. H04R 1/24 381/87

(Continued)

FOREIGN PATENT DOCUMENTS

GB 2551723 A 1/2018
GB 2586959 A 3/2021

(Continued)

OTHER PUBLICATIONS

GB2217215.9 Search Report, May 15, 2023, pp. 1-4.
EP23210157.6, European Search Report, Mar. 22, 2024, pp. 1-8.

*Primary Examiner* — Huyen D Le
(74) *Attorney, Agent, or Firm* — Kilpatrick Townsend & Stockton LLP

(57) ABSTRACT

A flat panel loudspeaker configured for mounting in an opening in a mounting surface includes a planar resonant panel configured to be inserted into an opening in the mounting surface and having a front surface and a rear surface. The flat panel loudspeaker also includes an exciter coupled to the rear surface and configured to cause an active portion of the planar resonant panel to vibrate and generate sound. An outer boundary of the active portion of the planar resonant panel is fixed relative to the mounting surface, the outer boundary defining the active portion as an area of the planar resonant panel. The planar resonant panel comprises an edge portion extending beyond the outer boundary of the active portion in at least one direction. The edge portion is configured to overlap the mounting surface.

20 Claims, 15 Drawing Sheets

(51) Int. Cl.
*H04R 7/04* (2006.01)
*H04R 9/06* (2006.01)

(52) U.S. Cl.
CPC ......... *H04R 9/06* (2013.01); *H04R 2201/021* (2013.01); *H04R 2400/11* (2013.01); *H04R 2440/01* (2013.01)

(56) References Cited

U.S. PATENT DOCUMENTS

| | | | | |
|---|---|---|---|---|
| 2002/0141607 | A1* | 10/2002 | Azima .................. | H04R 7/045 381/431 |
| 2008/0085029 | A1 | 4/2008 | Hagman | |
| 2016/0205454 | A1 | 7/2016 | Mordechai | |
| 2021/0160600 | A1* | 5/2021 | Newlove ................ | H04R 1/025 |

FOREIGN PATENT DOCUMENTS

| | | | |
|---|---|---|---|
| WO | 2000022877 | | 4/2000 |
| WO | 02078391 | A2 | 10/2002 |

* cited by examiner

FLAT PANEL LOUDSPEAKER WITH OVERHANGING PANEL AND METHOD OF INSTALLATION THEREOF

CROSS-REFERENCES TO RELATED APPLICATIONS

This application claims priority to United Kingdom Patent Application No. 2217215.9, filed on Nov. 17, 2012, entitled "Flat Panel Loudspeaker with Overhanging Panel and Method of Installation Thereof," the disclosure of which is hereby incorporated by reference in its entirety for all purposes.

TECHNICAL FIELD

The present disclosure relates to a flat panel loudspeaker with an overhanging panel and a method of installation thereof. Aspects of the invention relate to a flat panel loudspeaker, to a method of installation of the flat panel loudspeaker and to a method of manufacture of the flat panel loudspeaker.

BACKGROUND OF THE INVENTION

Flat panel loudspeakers can be installed in an opening defined in a surface of a building, such as a surface of a wall, a floor, or a ceiling. A front surface of a resonant panel of the flat panel loudspeaker is arranged to be substantially flush with, for example, the surface of the wall. One general appeal of flat panel loudspeakers installed in this way is that a flat panel loudspeaker can be made to look invisible. Once such a flat panel loudspeaker is mounted in the opening of the surface, the flat panel loudspeaker can be made "invisible" by blending the surface with a boundary of the flat panel loudspeaker insofar as it is generally not apparent that the flat panel of a loudspeaker forms part of the surface (or that the surface defines an opening therein).

To make the loudspeakers "invisible" where the surface of walls is to be formed by plastering, e.g. over plasterboard hung on stud walls, the flat panel loudspeaker can be mounted in an opening in the plastered wall to be flush with the wall surface, and then a skim that is applied to finish the plastered wall is also applied over the flat panel of the loudspeaker, thereby giving it substantially the same finish as the wall with which it is flush, making it invisible.

However, if the loudspeaker is not fit to the opening of the surface correctly or under ideal conditions, as the plaster skim dries it may shrink and embossed lines may appear and indicate the location of the loudspeaker.

Another form of wall construction that is common in certain markets is drywall lining, in which drywall gypsum boards are attached to stud walls to form the wall surface. The drywall boards themselves provide the wall finish, and so no plastering or finishing skim is applied. Rather, only the joints between the drywall boards are masked by the application of jointing tape and jointing compound to conceal them.

To make the loudspeakers "invisible" where the surface of walls is provided by drywall boards, the flat panel loudspeakers can be mounted in stud walls alongside drywall lining boards. However, due to the taping and jointing, flat panel loudspeakers can be more difficult to conceal as the jointing tape can stand proud of the speaker surface.

It is an aim of the present invention to address one or more of the disadvantages associated with the prior art.

SUMMARY OF THE INVENTION

Aspects and embodiments of the invention provide a flat panel loudspeaker; a method of mounting a flat panel loudspeaker; and a method for manufacturing a flat panel loudspeaker as claimed in the appended claims.

According to an aspect of the present invention there is provided a flat panel loudspeaker configured for mounting in an opening in a mounting surface, the flat panel loudspeaker comprising: a planar resonant panel insertable into an opening in the mounting surface and having a front surface, the front surface to face outwardly in the mounting surface when the flat panel loudspeaker is mounted in the mounting surface, and the resonant panel further having a rear surface opposite the front surface; and an exciter coupled to the rear surface of the resonant panel to cause an active portion of the resonant panel to vibrate on operation of the exciter, to generate sound; wherein when mounted in the mounting surface and when the resonant panel is caused by the exciter to vibrate on operation of the exciter, an outer boundary of an active portion of the resonant panel is fixed relative to the mounting surface, the outer boundary defining the active portion as an area of the resonant panel; and wherein the resonant panel comprises an edge portion extending beyond the outer boundary of the active portion in at least one direction in a plane of the resonant panel, the edge portion configured to overlap the mounting surface when the flat panel loudspeaker is mounted in the opening in the mounting surface.

In accordance with the above aspect of the disclosure, a flat panel loudspeaker is formed so as to be easily mounted in an opening in a mounting surface, such as a wall. The edge portion of the resonant panel extending beyond the active portion of the resonant panel enables the loudspeaker to be mounted in the opening in a quick and efficient manner, and the flat panel loudspeaker may be directly affixed to the opening. In addition, the resonant panel is formed as a single body, and when the loudspeaker is covered with a plaster skim, for example, the loudspeaker becomes substantially invisible to the eye.

Further, as the loudspeaker panel is formed as a single body, compared to a loudspeaker with multiple parts and affixed to the mounting surface requiring a perimeter joint to be taped and filled, for example, fire and water resistance of the loudspeaker is improved. In addition, the ingress of debris into the loudspeaker is prevented as there is no gap between the edge of the panel and the edge of the opening when the loudspeaker is mounted.

Further, only the resonant panel of the flat panel loudspeaker may be provided outside of the mounting surface in use. Thus, the flat panel loudspeaker may be more effectively hidden from view when the flat panel loudspeaker is covered by a wall coating.

In some examples, the edge portion is configured to couple to the mounting surface when the flat panel loudspeaker is mounted in the opening in the mounting surface. Advantageously, the rear surface of the edge portion may be provided with means to couple to the mounting surface. Thus the flat panel loudspeaker may be attached to the mounting surface by the edge portion of the resonant panel without requiring separate fixing means. A size and weight of the flat panel loudspeaker may thus be reduced. Further, the coupling of the edge portion to the mounting surface defines a boundary of the active portion as the edge portion is heavily damped by the coupling to the mounting surface and thus effectively prevents transfer of mechanical energy to outside of the active portion.

In some examples, the exciter may be coupled to the rear of the resonant panel and may be self-supporting. Advantageously, a support frame to support the exciter may not be required. In some examples, a self-supporting exciter may include a balanced spring suspension holding the exciter body in line with a couple foot which connects a voice coil to the surface of the resonant planar panel. In some examples, the support frame may comprise a foam backing. In some examples, the foam backing may comprise a foam pad bonded to the rear of the resonant panel and having sufficiently low density so as to have negligible damping and stiffening effects resonant panel, but which is capable of supporting the exciter in its position.

In some examples, the flat panel loudspeaker further comprises a support frame for mounting in the mounting surface and having the rear surface of the resonant panel fixed thereto around substantially the whole of the outer boundary of the active portion the resonant panel, such that when mounted in the mounting surface and when the resonant panel is caused by the exciter to vibrate on operation of the exciter, the outer boundary of the active portion of the resonant panel is fixed relative to the mounting surface; wherein the edge portion of the resonant panel extends beyond the support frame in at least one direction in the plane of the resonant panel. Advantageously, the support frame may provide support to the exciter and/or the resonant panel, and may define a boundary of the active portion by preventing transfer of mechanical energy to outside of the active portion.

In some examples, the exciter is configured to cause the active portion of the resonant panel to vibrate, and the edge portion is substantially fixed relative to the support frame (or mounting surface when mounted) and does not vibrate to generate sound. That is, the support frame prevents the transfer of energy from the active portion to the edge portion, and the edge portion is further heavily damped by its attachment to the mounting surface. Advantageously, the use of the edge portion to mount the flat panel loudspeaker to the mounting surface does not interfere with the acoustic or resonant properties of the flat panel loudspeaker.

In some examples, the resonant panel is formed as a composite panel comprising the active portion and the edge portion as a continuous panel. The composite panel may comprise a plurality of layers including a first skin, a second skin, and a core arranged between the first skin and the second skin. The plurality of layers may further comprise a first adhesive layer between the first skin and the core and a second adhesive layer between the second skin and the core. Advantageously, by forming the resonant panel as a composite panel, the resonant panel may be formed to be lightweight and very thin, so as to improve the sensitivity response of the resonant panel to vibrate, thereby improving the efficiency of the loudspeaker.

The first and second skins may be formed of at least one layer comprising at least one of carbon fiber, a carbon-nanotube resin, layered glass, one or more synthetic fibers (such as Kevlar), resin impregnated synthetic fiber based material, or one or more natural fibers (such as hemp). The fibers of the first skin and the second skin may be woven, or laid in parallel strands and not woven. The layers of the first skin and the second skin may optionally be laid in different orientations in order to allow the resulting resonant panel to be similarly stiff in all directions. The first skin and the second skin may comprise at least one layer of a suitable solid plastic sheet material (such as acetate or mylar), paper and/or a hybrid of said fibers. The first skin and the second skin may be adhered to the core. A first adhesive layer may be arranged between the core and the first skin and a second adhesive layer may be arranged between the core and the second skin so as to adhere the first skin and the second skin to the core. The adhesive layers may be formed of a chemically suitable adhesive. The core may comprise one of a synthetic or natural-based foam, wood (such as balsa wood), metallic honeycomb (such as aluminum), resin-dipped paper-based honeycomb, carbon (such as graphene), metal or a lightweight plastics-based webbed structure, which may be formed by deposition, etching, extrusion, molding or additive printing processes. In examples where the core comprises a foam core, the core may be formed of a polymethacrylimide (PMI) foam (such as Rhoacell), a polyvinyl chloride (PVC) foam, other synthetic hydrocarbon foam, or a woven and/or non-woven fiber-based foam, such as phenolic, melamine formaldehyde or other resin-based glass fiber foamed core. Advantageously, by forming the resonant panel as a composite panel, the resonant panel may be formed to be lightweight and very thin, so as to improve the sensitivity response of the resonant panel to vibrate, thereby improving the efficiency of the loudspeaker.

In some examples, the resonant panel is formed as a monolithic panel comprising the active portion and the edge portion as a continuous panel. Advantageously, the manufacture of the resonant panel may be simplified, and the resonant panel including the edge portion may be formed by mold-pressing.

In some examples, the resonant panel and the support frame are each substantially rectangular, each substantially triangular, or are each substantially circular, and the edge portion of the resonant panel extends beyond an edge of the opening, beyond the outer boundary of the active portion and beyond the support frame in at least one direction in the plane of the resonant panel. Advantageously, the edge portion may extend beyond the boundary of the active portion, the opening and the support frame in a similar manner around the perimeter of the active portion, and thus may be fitted to the mounting surface in a variety of orientations by attaching to one or more sides of a perimeter surrounding the opening in the mounting surface, and may form a strong attachment to the mounting surface.

Advantageously, certain shapes such as triangular shapes for the support frame and the resonant panel may be an efficient shape to cut from a manufactured sheet of resonant panel material, as will be discussed. In addition, installation of the flat panel loudspeaker may be simplified in a similar way by the use of a triangular loudspeaker, as fewer cuts in the mounting surface are required compared to a rectangular shape. Further, a triangular panel may have acoustic benefit compared to certain other shapes.

In some examples, the edge portion comprises a rear surface to face toward the mounting surface when the flat panel loudspeaker is mounted in the mounting surface; and the rear surface of the edge portion comprises coupling means configured to couple to the mounting surface when the flat panel loudspeaker is mounted in the opening in the mounting surface. Advantageously, the rear surface of the edge portion may mount the flat panel loudspeaker to an outer surface of the mounting surface surrounding the opening, while the rear parts of the flat panel loudspeaker including the exciter and the support frame may be received within the opening. Thus, the flat panel loudspeaker may be mounted flush with the surface of the mounting surface.

In some examples, the coupling means of the rear surface of the edge portion comprises one or more of a clamp, adhesive, adhesive tape, or an opening engageable by a fastener to couple the edge portion to the mounting surface.

Advantageously, the installation of the flat panel loudspeaker may be simplified. For example, when the edge portion comprises the adhesive or the adhesive tape, the flat panel loudspeaker may be easily installed by locating the flat panel loudspeaker over the opening and applying pressure to adhere the adhesive or adhesive tape to the surface of the mounting surface surrounding the opening. For example, when the edge portion comprises an opening, the opening may be engageable by a clamp or a clamping fixture for clamping the edge portion to the mounting surface. Advantageously, such a clamp may be removable hold the loudspeaker in place when locating the flat panel loudspeaker over the opening to aid installation.

In some examples, the edge portion comprises a front surface to face outwardly in the mounting surface when the flat panel loudspeaker is mounted in the mounting surface; wherein the front surface of the edge portion is configured to bond with a wall coating applied to the mounting surface and the front surface of the resonant panel when the flat panel loudspeaker is mounted in the mounting surface to thereby support the flat panel loudspeaker in the mounting surface and to hide the flat panel loudspeaker from view. Advantageously, a covering material such as the wall surface, which may be a coating such as a plaster skim, adheres to the front surface of the panel and thus hides the panel from view. Further, applying the wall coating or plaster skim over the front surface of the edge portion and the surrounding areas of the mounting surface further secures the flat panel loudspeaker in the opening, as the wall coating dries over both the front surface of the edge portion and the surround area of the mounting surface.

In some examples, the wall coating is a plaster skim. Advantageously, the flat panel loudspeaker may be made substantially “invisible” when mounted on a plaster wall. Further, the plaster skim may be painted over when dried.

In some examples, the front surface of the entire resonant panel is configured to bond with the wall coating. Advantageously, a continuous wall coating may be applied over the whole front surface of the flat panel loudspeaker, and thus the flat panel loudspeaker may be hidden from view.

In some examples, the front surface of the edge portion is formed to have a rough surface so as to provide a surface to which the wall coating adheres. For example, the front surface may be designed to have a ridged, perforated, or granular textured surface similar to sandpaper. Thus, adhesion of the wall coating is improved compared to a smooth surface, as a larger surface area is provided as compared with a smooth surface for the wall coating to fill and dry into variations in the surface relief of the rough surface.

In some examples, the rear surface of the resonant panel is formed to have a substantially smooth surface so as to provide a surface to which the exciter is coupled. For example, the rear surface of the resonant panel may include an adhesive layer comprising an adhesive film, such as an acrylic film, to couple the exciter to the rear surface of the resonant panel by adhesion. By providing a substantially smooth surface on the rear surface of the resonant panel, this promotes bonding of the adhesive film to the rear surface of the resonant panel when coupling the exciter to the resonant panel.

In some examples, the front surface of the edge portion comprises an outwardly facing paper skin layer provided on the front surface of the edge portion and adapted to bond with the wall coating. Advantageously, the paper skin layer may be designed to bond with the wall coating to ensure good coverage of the resonant panel with the wall coating.

In some examples, the paper skin layer is configured to absorb moisture from the wall coating to thereby bond with the wall coating.

In some examples, the front surface of the edge portion comprises a primer coating adapted to bond with the wall coating. For example, the primer coating may be a synthetic primer designed to provide a surface to which plaster will bond and adhere.

In some examples, the resonant panel is formed of a stiff and substantially water-proof material. Advantageously, the resonant panel is formed to have sufficient strength to support the flat panel loudspeaker when the flat panel loudspeaker is affixed to the mounting surface by the edge portion of the resonant panel. Further, the flat panel loudspeaker is protected against the ingress of water or moisture. Further, if a plaster coating is applied to the water-proof material, shrinkage of the plaster coating and associated visible lines is reduced as moisture is not absorbed into the surface of the resonant panel.

In some examples, the resonant panel is formed of at least one of carbon fiber, a carbon-nanotube resin, layered glass, one or more synthetic fibers (such as Kevlar), and one or more natural fibers.

In some examples, the resonant panel has a thickness of between approximately 0.3 mm and 3 mm in the active portion, and between approximately 0.3 mm and 1 mm in the edge portion. In examples where the resonant panel is a composite panel, the first skin and the second skin may be equal to or less than one third of the thickness of the resonant panel.

In some examples, the flat panel loudspeaker is a distributed mode loudspeaker configured to produce sound by inducing distributed vibration modes in the resonant panel.

In some examples, when the flat panel loudspeaker is mounted in the mounting surface, the edge portion of the resonant panel extends substantially parallel to the mounting surface and is sized such that in use, when a layer of wall coating is applied to the mounting surface and the edge portion, the edge portion becomes embedded within the layer of wall coating and is hidden from view. Thus, the resonant panel is hidden from view and the layer of wall coating improves the fixing of the flat panel loudspeaker in the opening.

In some examples, the flat panel loudspeaker further comprises a mounting unit for mounting in the surface and having the resonant panel and exciter provided therein. Thus, the flat panel loudspeaker may be easily installed in the opening, and the rear of the resonant panel and the exciter may be protected by the mounting unit.

In some examples, a surface of the mounting unit has defined therein at least one hole arranged to facilitate sound to pass from within the mounting unit out of the flat panel loudspeaker to a mounting cavity defined rearwardly of the mounting surface. Thus, acoustic properties of the loudspeaker may be improved.

In some examples, the flat panel loudspeaker further comprises fixing means extending from a rear surface of the mounting unit and configured to couple to an interior element of the mounting surface. Advantageously, the flat panel loudspeaker may be fixed more securely within the opening through the coupling of the fixing means and the interior element of the mounting surface. In some examples, the interior element of the mounting surface may be a wall stud. For example, the fixing means may serve as a backup safety fixing, which may be particularly useful in environments prone to disruption, such as an earthquake prone area.

According to another aspect of the present invention there is provided a method for mounting a flat panel loudspeaker in a mounting surface facing outwardly, the method comprising: inserting a flat panel loudspeaker according to any of the preceding aspects or examples into an opening defined in the mounting surface and sized to fit the resonant panel of the flat panel loudspeaker therein, until the edge portion of the resonant panel is against the mounting surface, with the front surface of the resonant panel substantially flush with the mounting surface; and securing the flat panel loudspeaker in the mounting surface.

Advantageously, the flat panel loudspeaker may be easily secured in the opening, and may be installed by a layman without requiring technical skills. Further, no special tools or equipment are required for the installation.

In some examples, securing the flat panel loudspeaker in the mounting surface comprises at least one of: engaging coupling means provided on a rear surface of the edge portion with the mounting surface; and applying a wall coating to cover the resonant panel and at least a partial area of the mounting surface surrounding the opening. Engaging the coupling means may comprise clamping the edge portion to the mounting surface. Advantageously, the installation of the flat panel loudspeaker is simplified, as the fixing of the loudspeaker in the opening is achieved by elements provided on the rear surface of the edge portion of the resonant panel, and/or by the wall coating which is applied to also hide the resonant panel from view.

According to another aspect of the present invention, there is provided a method of manufacturing a flat panel loudspeaker according to any of the preceding aspects or examples, the method comprising mold-casting the resonant panel to include a rough surface on the front surface of the edge portion of the resonant panel.

In some examples, the method may further comprise providing panel material, applying heat and pressure to the panel material to form a sheet, and cutting the sheet to form the resonant panel.

In some examples, the resonant panel is formed to be a composite panel. Forming the resonant panel as a composite panel may comprise producing a first prepreg for the first skin and a second prepreg for the second skin and a pre-manufactured substrate for the core, the pre-manufactured substrate configured to be substantially chemically and structurally insensitive to heat pressing. The method may further comprise arranging the pre-manufactured substrate between the first prepreg and the second prepreg and laying the arrangement into a press with platens on either side of the prepreg. One platen has a tooled rough textured surface. The other platen has a smooth surface. The prepreg skins are then heated (to around 140C to 150C) under pressure and thermoset to bond with the pre-manufactured core to form a composite sheet, one side of which is smooth and the other side is rough which will encourage the wall coating such as a plaster to bond to it.

In some examples, the prepreg may be produced from multiple thin layers of material such as one or more of synthetic fibers, natural fibers, carbon fiber, glass, or Kevlar, some of which may be woven, or laid in parallel strands and not woven. The layers may optionally be laid in different orientations in order to allow the panel to be similarly stiff in all directions.

The thermoset sheet is then cut up into panels of the size and shape required to form the resonant panel of the flat panel loudspeaker. The resonant panel may then be attached to the exciter, and optionally to the support frame and the mounting unit if used.

Advantageously, the method of manufacture produces a resonant panel with one smooth side (to form the rear surface of the resonant panel) and one textured or rough surface (to form the front surface), the textured or rough surface being adapted to adhere well to wall coatings such as plaster, and the smooth side adapted to couple well to the exciter. The panel may therefore easily be cut to any shape or size as required for the production of the flat panel loudspeaker. In one example, the sheet may be cut so as to form multiple resonant panels having the same shape arranged in the same orientation on the sheet.

In other examples, forming the resonant panel as a composite panel may comprise producing a first pre-manufactured substrate for the first skin and a second pre-manufactured substrate for the second skin and a prepreg for the core, and arranging the prepreg between the first and second pre-manufactured substrates, and laying the arrangement into the press as described in the above example, to cause the prepreg to bond with the first and second pre-manufactured substrates, so as to form the composite sheet. The composite sheet may then be cut to form the composite panel as described in the above example.

In further examples where the resonant panel is formed to be a composite panel, forming the resonant panel may comprise producing three pre-manufactured substrates, and arranging a first adhesive layer between a first and second of the pre-manufactured substrates and a second adhesive layer between the second and third of the pre-manufactured substrates and laying the arrangement in the press as described in the above example to cause the adhesive to adhere the three pre-manufactured substrates together so as to form the composite sheet. The composite sheet may then be cut to form the composite panel as described in the above example.

In examples where the resonant panel is formed to be a monolithic panel, forming the resonant panel may comprise producing a prepreg and laying the prepreg into the press described in the example above, so as to cause the prepreg to thermoset into a solid 'monolithic' sheet. The monolithic sheet may then be cut to form the monolithic panel as described in the above example.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION OF THE INVENTION

The present disclosure relates to a flat panel loudspeaker for mounting into an opening in a mounting surface such that the flat panel loudspeaker can be covered with a coating and made substantially invisible to the eye. The mounting surface may be an interior or exterior surface such as a wall, ceiling or floor of a building, but it should be understood that the present disclosure is not limited thereto. In some examples, the mounting surface may be a drywall, stud wall or plasterboard wall, where sheets or boards are attached to substantially parallel structural elements such as studs or beams, to thereby cover gaps between adjacent elements. For example, a frame of timber or metal studs may be assembled and secured to the floor and/or ceiling of a building, and plasterboard sheets attached on either side of the frame to create a smooth and uniform wall surface with an internal void between adjacent frame members. An opening may be created in the sheets and the flat panel loudspeaker according to the present disclosure may be inserted into and secured in the opening such that the flat panel loudspeaker is received within the opening (and thus the void) and substantially flush with the wall surface. Optionally, the flat panel loudspeaker may then be covered with a wall coating such as a plaster skim to hide the flat panel loudspeaker from view. However, it should be understood that the flat panel loudspeaker according to the present disclosure may be mounted into any suitable opening for receiving the flat panel loudspeaker.

Figure 1A:
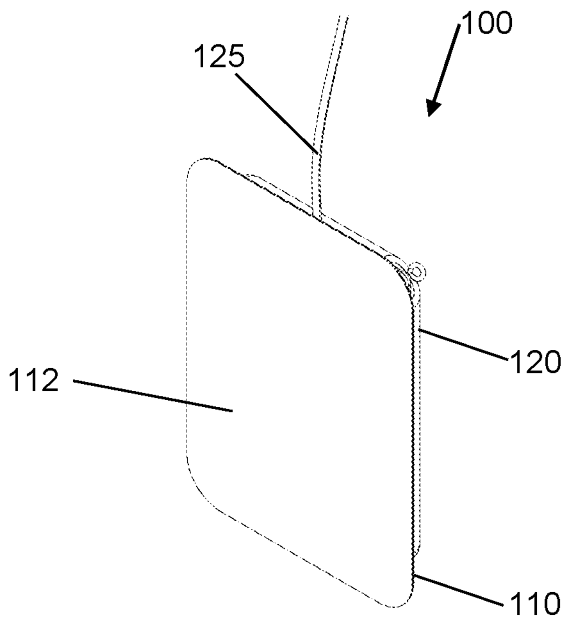
FIG. 1A shows a view of a front side of a flat panel loudspeaker according to an embodiment of the present invention.
Figure 1B:
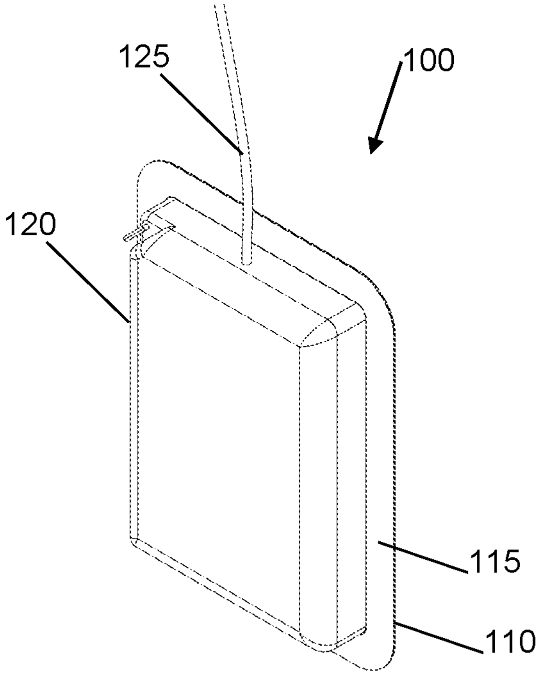
FIG. 1B shows a view of a rear side of the flat panel loudspeaker of FIG. 1A.

A flat panel loudspeaker 100 according to an embodiment of the present invention is shown in FIGS. 1A-1E. FIG. 1A shows a frontal view of the flat panel loudspeaker 100 and FIG. 1B shows a rear view of the same flat panel loudspeaker 100 as FIG. 1A. The flat panel loudspeaker 100 comprises a resonant panel 110, a support frame 120, a cable 125, an exciter 150 and a mounting unit (not shown).

The resonant panel 110 is a planar resonant panel formed to have a front surface 112 shown in FIG. 1 and a rear surface shown in FIG. 1B. The resonant panel 110 is attached to the support frame 120 on the rear surface on the resonant panel 110. The resonant panel 110 may be formed as a single and substantially planar body, and has an area larger than the area of the support frame 120, such that the resonant panel 110 extends beyond the support frame 120 in at least one direction.

Figure 4A:
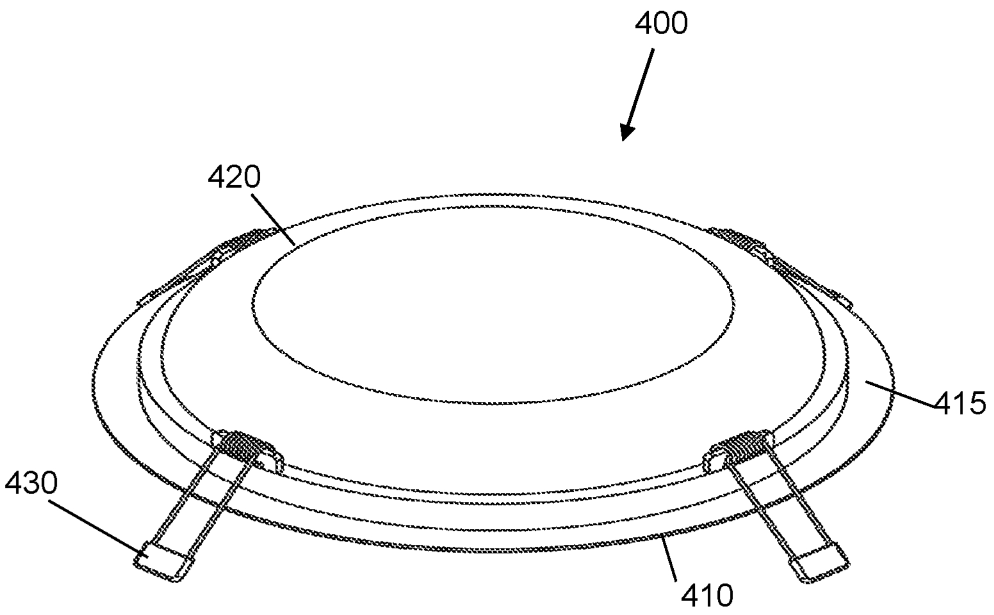
FIG. 4A shows a view of a circular flat panel loudspeaker with fixing means for facilitating removal of the flat panel loudspeaker from the mounting surface according to an embodiment of the present invention.
Figure 4B:
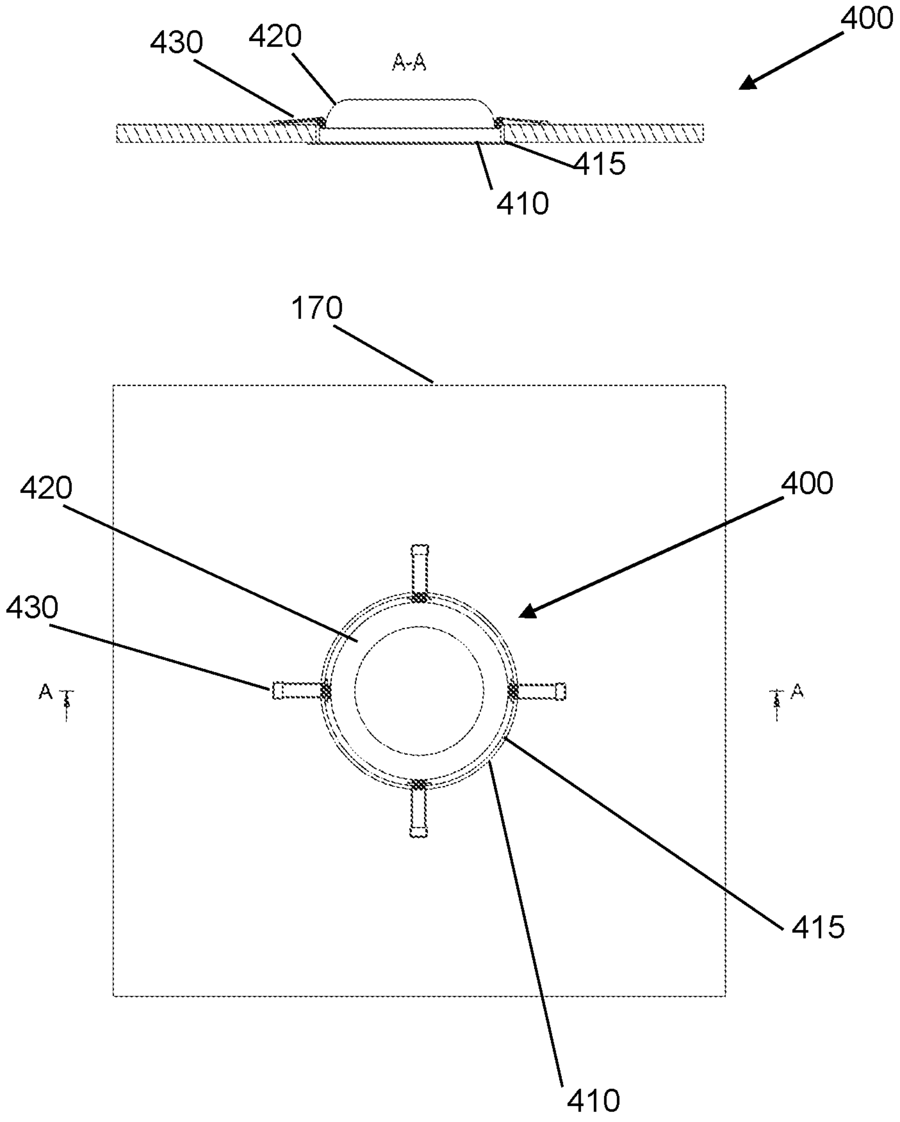
FIG. 4B shows cross-sectional views of the circular flat panel loudspeaker of FIG. 4A installed in a mounting surface.

FIGS. 1A and 1B show that the resonant panel 110 and the support frame 120 are substantially rounded rectangular in shape, but the present invention is not limited thereto. In another example, the resonant panel 110 and/or the support frame 120 may be a different shape, and for example may be substantially circular, as shown in FIGS. 4A and 4B. In another example, the resonant panel 110 and/or the support frame 120 may be substantially triangular. The resonant panel 110 may extend beyond the support frame 120 in one or more directions in the plane of the resonant panel 110. For example, FIGS. 1A and 1B show an example where the resonant panel 110 extends beyond the support frame 120 by a substantially equal amount in each direction in the plane of the resonant panel 110. However, in another example, the resonant panel 110 may extend beyond the support frame 120 in fewer directions, or by a different distance in different directions in the plane of the resonant panel 110. The support frame 120 may have a shape similar to that of the resonant panel 110, and thus in some examples may be substantially rounded rectangular or substantially circular.

Figure 1C:
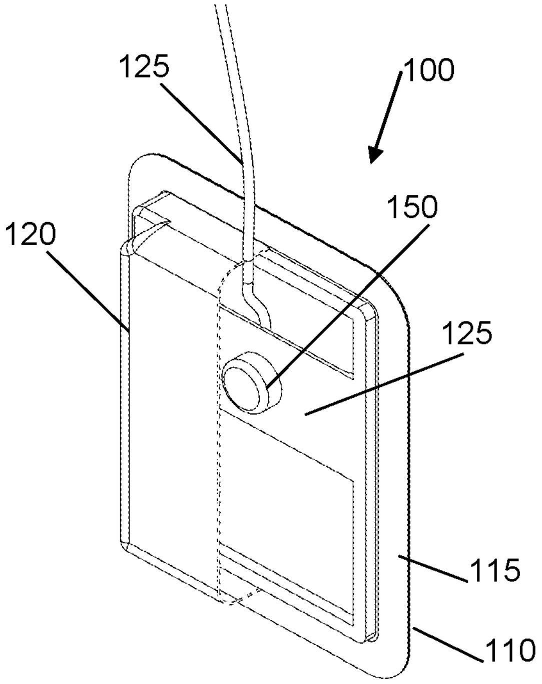
FIG. 1C shows a view in which the rear side of the flat panel loudspeaker of FIG. 1B is cut away to show an interior of the support frame and an exciter.
Figure 1D:
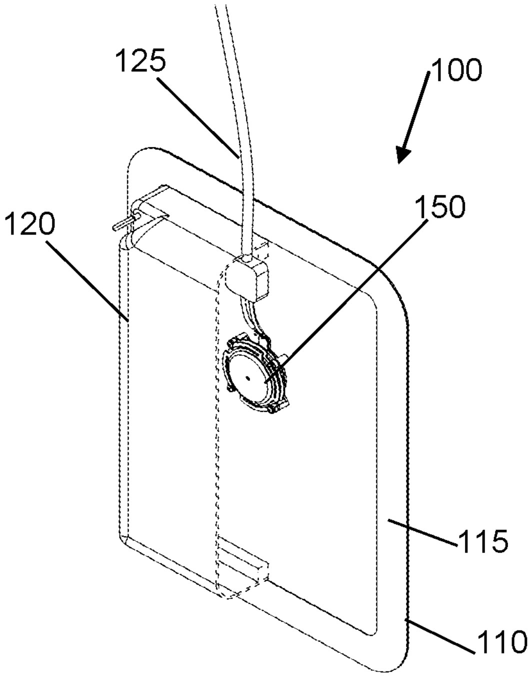
FIG. 1D shows a view in which the rear side of the flat panel loudspeaker of FIG. 1B is cut away to show an interior of the support frame and a self-supporting exciter.
Figure 1E:
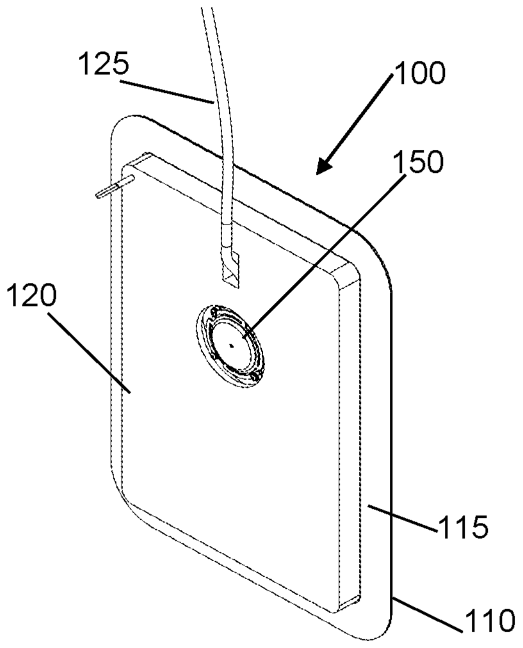
FIG. 1E shows a view of a rear side of a flat panel loudspeaker comprising an exciter surrounded by a foam pad according to an embodiment of the present invention.

The resonant panel 110 comprises an active area on the front surface 112 having a boundary corresponding to the position of the support frame 120 on the rear of the resonant panel 110, and an edge portion 115 surrounding the active area. The active area of the resonant panel 110 is fixed at the boundary of the active area to the support frame 120. The resonant panel 110 may be coupled to the exciter 150 (not shown in FIGS. 1A and 1B) on the rear surface. The exciter 150 is shown in FIGS. 1C to 1E, and may comprise any known type of exciter, and may optionally be a self-supporting exciter 150 or an inertial exciter as shown in FIGS. 1D and 1E. The exciter 150 may also be a inertial exciter, which while not fully self-supporting, may require reduced support compared to other types of exciter, and which may be supported on the rear surface of the resonant panel 110 by a light-weight foam provided to substantially surround and thus support the exciter 150, as shown in FIG. 1E.

The resonant panel 110 is configured to vibrate and output sound in response to operation of the exciter 150, which may be connected to the rear of the resonant panel 110 by an exciter foot. The active area of the resonant panel 110 may vibrate in response to the operation of the exciter 150. The active area of the resonant panel 110 may be defined by an outer boundary, which defines a fixed edge of the active area, and which is fixed relative to the mounting surface. The operation of the exciter 150 may be controlled by an internal or external controller which outputs command signals to the exciter 150, to thereby cause the exciter 150 to vibrate the resonant panel 110. The vibrations may be determined and controlled to output a desired sound. As the boundary of the active area of the resonant panel 110 is fixed with respect to the support frame 120, the edge portion 115 extending beyond the active area of the resonant panel 110 may not contribute to the sound output of the resonant panel 110 during operation, as the support frame 120 prevents the transfer of energy from the active portion to the edge portion 115, and the edge portion 115 is further heavily damped by its bonding to the mounting surface in use. Thus, the flat panel loudspeaker 100 may be a distributed mode flat panel loudspeaker, in which resonant modes are introduced in the resonant panel 110, and in particular in the active area of the resonant panel 110.

The resonant panel 110 may be formed of a material which is one or more of strong, stiff, water-proof or fire-resistant. In some examples, the resonant panel 110 may be formed of at least one of carbon fiber, a carbon-nanotube resin, layered glass, one or more synthetic fibers, or one or more natural fibers.

The resonant panel 110 may be formed as a composite panel by stacking multiple layers, as will be discussed later in relation to FIGS. 7, 8A and 8B. Alternatively, the resonant panel 110 may be formed as a monolith. As will be discussed later with respect to FIG. 6, the resonant panel 110 may be formed as a single large sheet and then cut to a particular size or shape for forming the flat panel loudspeaker.

The front surface 112 of the resonant panel 110 of FIG. 1 is configured to bond with a wall covering, such as a wall plaster or paint. In one example, the resonant panel 110 is provided with a rough, granular texture (which may be understood to be similar in some ways to a rough sandpaper) such that the wall covering fills in inconsistencies in the surface relief of the front surface 112 of the resonant panel 110. Thus, adhesion of the wall covering to the front surface 112 of the resonant panel 110 is improved, as surface area of the front surface 112 of the resonant panel 110 is increased and the front surface 112 provides a surface in which the wall coating may deposit and bond. In another example, the front surface 112 of the resonant panel 110 may be coated with a plaster primer, such as a synthetic primer, such that plaster adheres to the primer. In another example, the front surface 112 of the resonant panel 110 may be covered with an outwardly facing paper skin layer adapted to bond with the wall coating. For example, the paper skin may be configured to absorb moisture from the wall coating and thereby form a bond with the wall coating. In other examples, the front surface 112 of the resonant panel 110 may be otherwise textured to improve adhesion to the wall coating, and specifically to wall plaster, for example by inclusion of perforations or ridges on the front surface 112 of the resonant panel 110 to increase a surface area of the front surface 112 to which the wall coating can adhere, and to provide a surface which encourages bonding with the wall coating.

In some examples, the entire front surface 112 of the resonant panel 110 may be textured or coated as described above to improve adhesion to the wall coating. In another example, only part of the front surface 112 may be textured or coated as described above. For example, in one example, only the edge portion 115 of the front surface 112 may be textured or coated as described above. In yet another example, different texturing or surface features may be provided in different areas of the front surface 112. For example, the edge portion 115 may be provided with surface features such as texturing to improve adhesion to the wall coating, while a central region of the front surface 112 may be textured so as to display a logo or image on the front surface 112 of the resonant panel.

The resonant panel 110 may be formed to have a thickness of between approximately 0.3 mm and approximately 3 mm. The resonant panel 110 may have a constant thickness, or may have a different thickness at different parts of the resonant panel 110. For example, the active portion may have a different thickness to the edge portion 115. In one example, the active area of the resonant panel 110 may have a thickness of between approximately 0.3 mm and approximately 3 mm, and the edge portion 115 may have a thickness of between approximately 0.3 mm and approximately 1 mm. By providing such a thin resonant panel, this allows plaster to sufficiently cover the surface of the panel to make the panel "invisible" once mounted. The thickness of the resonant panel 110 may be varied based on the type of surface to which the flat panel loudspeaker 100 is to be mounted, or on the type of wall coating which is applied to the flat panel loudspeaker 100 after installation. For example, different wall coatings may typically be applied at different thicknesses to a wall, and as such the resonant panel 110 may have a thickness which allows for it to be covered with the wall coating and to appear flush with surrounding areas of the mounting surface.

As explained, the resonant panel 110 may have a uniform thickness or may have a varying thickness in different regions of the resonant panel 110. For example, the thickness of the resonant panel 110 may vary within the active area. In one example, the active area may be thinner directly in front of the exciter to improve high frequency sound generation. Other areas may be thickened to perform a mechanical tuning function. It should be understood that where the resonant panel 110 has a varying thickness, it may still have a substantially planar front surface 112, while the rear surface varies in height, such that the resonant panel 110 may still appear flush with the mounting surface when mounted.

The resonant panel 110 may be formed from a variety of materials. In particular, the resonant panel 110 may be formed from one or more of a carbon fiber, a carbon-nanotube resin, layered glass, one or more synthetic fibers such as Kevlar, or one or more natural fibers. It should be understood that the resonant panel 110 may be formed of other materials, or of a mixture of materials as a composite. The resonant panel 110 may be formed of a material which has a high stiffness and is water-proof or water-resistant.

As discussed above, some or part of the front surface 112 of the resonant panel 110 is provided with a textured surface, primer coating (such as a synthetic primer) or paper skin to improve adhesion to wall coating applied to the front surface 112 of the resonant panel 110. Meanwhile, the rear surface of the resonant panel 110 of FIG. 1 is adapted to adhere to the mounting surface. As discussed above, the flat panel loudspeaker 100 is designed for being inserted into and mounted on an opening in a mounting surface, such as a wall, ceiling or floor. The rear surface of the edge portion 115 of the resonant panel 110 is arranged to overlap and adhere to an outer perimeter surface area of the mounting surface surrounding the opening, while the support frame 120 and the exciter are received within the opening. This is discussed in greater detail later with respect to FIG. 3.

The rear surface of the edge portion 115 is therefore provided with coupling means to couple to the mounting surface when the flat panel loudspeaker 100 is mounted in the opening in the mounting surface. The rear surface of the edge portion 115 may overlap an area of the mounting surface surrounding the perimeter of the opening such that when the flat panel loudspeaker 100 is inserted into the opening, the rear surface of the edge portion 115 is pressed against the area of the mounting surface surrounding the perimeter of the opening and the support frame 120 is received within the opening. As will be discussed below in respect of FIGS. 1D and 1E, in some examples, the support frame 120 may be omitted, and thus when the flat panel loudspeaker 100 is inserted into the opening, an area of the rear surface of the resonant panel 110 to which one or more self-supporting exciters 150 are attached is received within the opening.

The rear surface of the edge portion 115 is provided with coupling means to couple to the mounting surface. That is, the rear surface of the edge portion 115 is provided with means by which the resonant panel 110 and thus the flat panel loudspeaker 100 adheres to the mounting surface when the flat panel loudspeaker 100 is introduced into the opening and when the edge portion 115 of the resonant panel 110 is pressed against the mounting surface surrounding the opening.

Figure 9:
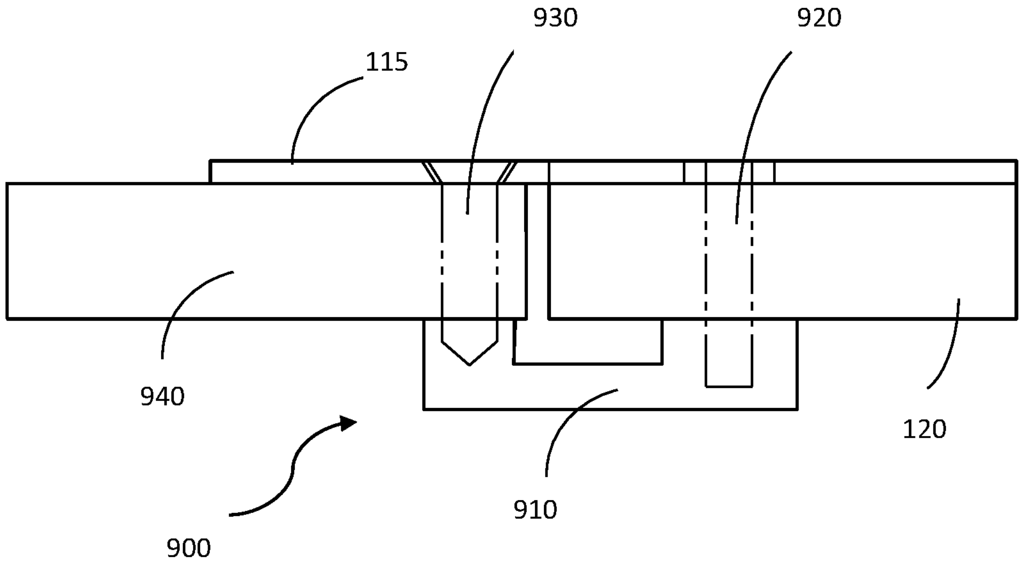
FIG. 9 shows a cross-sectional view of the flat panel loudspeaker of any of FIGS. 1 to 4 during installation into a mounting surface using coupling means in accordance with an embodiment of the present invention.

FIG. 9 illustrates an example of the flat panel loudspeaker of FIGS. 1A and 1B described above during installation in the mounting surface and including coupling means provided as a clamp 900 or clamping fixture. The area 940 of the mounting surface surrounding the perimeter of the opening of the mounting surface is shown abutting the edge portion 115 of the resonant panel, with the support frame 120 received within the opening. The clamp 900 comprises a spring clamp, such as a dog-ear spring clamp or any suitable spring clamp, which includes a clamping arm 910, a first screw 920 and an optional second screw 930. The clamping arm 910 is arranged to the rear of the support frame 120. The first screw 920 is arranged to couple the clamping arm 910 to the support frame 120 via the active portion of the resonant panel. The second screw 930 is arranged to couple the clamping arm 910 with the area 940 of the mounting surface surrounding the perimeter of the opening via the edge portion 115 of the resonant panel. The first screw 920 and second screw 930 are arranged to be substantially flush with the front surface of the resonant panel. The clamp 900 is therefore arranged to clamp the flat panel loudspeaker to the mounting surface 940.

It will be appreciated however that the second screw 930 is optionally provided, and the clamp may be provided with only the first screw 920. It will also be appreciated that the coupling means may be used for coupling any of the flat panel loudspeakers shown in FIGS. 1A to 4 to a suitable mounting surface. It should be understood that the coupling means is not limited to the above disclosure and may be implemented in a variety of different ways. For example, the coupling means may comprise one or more of an adhesive applied to the rear surface of the edge portion 115, a self-adhesive tape including a paper cover over a layer of adhesive tape applied to the rear surface of the edge portion 115, or mechanical fastening means for attaching to corresponding elements in or on the opening, such as hooks, clips or similar. It should also be understood that the coupling means may be provided across the entire rear surface of the edge portion 115 of the resonant panel 110, or may only be provided on parts of the rear surface of the edge portion 115, such as the top or bottom. Further, it should be understood that the coupling means provided on the rear surface of the edge portion 115 of the resonant panel 110 may be sufficient to secure the flat panel loudspeaker 100 in the opening. As will be discussed with respect to FIGS. 2 to 4, additional supporting elements in the form of fixing means 130 may also be provided to further secure the flat panel loudspeaker 100 in the opening.

The support frame 120 may be formed of a resilient material such as a metal frame. In another example, the support frame 120 may be formed of an injection molded plastic. For example, the plastic may be a plastic which is doped with one or more minerals or rubber to make the plastic inert and improve absorption of mechanical energy, thus reducing the energy passing into the surrounding mounting surface, and into the edge portion 115 of the resonant panel 110. In another example, the support frame 120 may be formed by inserting a separate material such as rubber in to the support frame 120 such that the separate material such as the rubber acts as a mechanical energy absorber, and improves mechanical energy absorption of the support frame 120. The support frame 120 may provide support to the resonant panel 110 and the exciter, or in another example, as discussed below, may provide support to the exciter only. As discussed above, the support frame 120 may couple to the resonant panel 110 so as to define fixed points in the resonant panel 110 at the coupling locations, and thereby define a boundary of the active area.

The flat panel loudspeaker 100 may therefore be configured so as to be mounted in an opening in a mounting surface, and secured in place by the coupling means provided on the rear surface of the edge portion 115 of the resonant panel 110. The flat panel loudspeaker 100 may be mounted in the opening such that the edge portion 115 of the resonant panel 110 extends substantially parallel to the mounting surface and is sized such that in use, when a layer of wall coating is applied to the mounting surface and the edge portion 115, the edge portion 115 becomes embedded within the layer of wall coating and is hidden from view.

The flat panel loudspeaker 100 may also comprise a mounting unit for mounting in the mounting surface. The resonant panel 100 and exciter 150 may be provided within the mounting unit. In some examples, mounting unit has defined therein at least one hole arranged to facilitate sound to pass from within the mounting unit out of the flat panel loudspeaker to a mounting cavity defined rearwardly of the mounting surface.

The flat panel loudspeaker of FIG. 1 further comprises a cable 125. The cable 125 may provide electrical power to the flat panel loudspeaker 100 and command signals to the exciter 150.

FIG. 1C illustrates a view where a rear covering portion of the support frame 120 is cut away so as to show the exciter 150. The exciter 150 may be mounted to a mounting portion 125 of the support frame 120 provided centrally with respect to the resonant panel 110. The exciter 150 may be coupled to and supported by the mounting portion 125 of the support frame 120 by any suitable means.

In another example, as shown in FIGS. 1D and 1E, the flat panel loudspeaker 100 of FIGS. 1A-1C may be modified to omit the support frame 120. In this case, the exciter 150 may be self-supporting or partially self-supporting on the rear surface of the resonant panel 110. For example, the exciter 150 may be an inertial exciter which is configured to move in the opposite direction to the resonant panel 110 as its drives the resonant panel 110, in contrast to an exciter fixed within a mounting frame such as the exciter 150 of FIG. 1C, which remains fixed in position due to the rigid structure provided by the mounting portion 125 of the support frame 120. Thus, an inertial self-supporting or partially self-supporting exciter may require reduced support. In FIG. 1D, the exciter 150 may be a self-supporting exciter, and may not require separate supporting structures. In FIG. 1E, the exciter 150 may be a partially self-supporting exciter, which requires reduced support compared to the fixed exciter 150 of FIG. 1C, and may receive sufficient support from the foam surrounding the exciter 150.

It should be understood that the support frame 120 may have a shape different to that shown in the Figures. In particular, the support frame 120 may be configured so as to support an exciter and define an outer boundary of the active area of the resonant panel 110; to define the outer boundary of the active area but not support the exciter; to support the exciter but not define the outer boundary of the active area (which may then be defined by the coupling of the edge portion 115 to the mounting surface, as discussed); or may not be required to support the exciter or define the outer boundary of the active portion, and thus may be omitted.

Further, the active area of the resonant panel 110 may have a boundary defined by the edge portion 115 of the resonant panel 110 which is mounted to the surface of the mounting surface, alternatively or in addition to the boundary being defined by the support frame 120. In this case, the edge portion 115 of the resonant panel 110 is heavily damped by the coupling to the mounting surface and acts as a fixed boundary for the active area, such that the edge portion 115 does not significant resonate or vibrate to produce sound, and the acoustic properties of the flat panel loudspeaker 100 are similar as when the support frame 120 is included. In this example, when the flat panel loudspeaker 100 omitting the support frame 120 is inserted into the opening, the exciter 150 is still received in the opening, and the edge portion 115 of the resonant panel 110 still attaches to the surface of the mounting surface surrounding the opening as discussed above.

The self-supporting exciter 150 may be any type of self-supporting exciter known in the art. In one example, the self-supporting exciter 150 comprises a balanced spring suspension holding the exciter body in line with a couple foot which connects a voice coil to the surface of the resonant planar panel 110. The self-supporting exciter 150 may be a form of inertial exciter configured to move during driving of the resonant panel 110. It should be understood that the exciter 150 may be fully self-supporting as shown in FIG. 1D or partially self-supporting as shown in FIG. 1E. A partially self-supporting exciter may be supported by a more lightweight structure such as a foam pad, as will be discussed.

In the example of FIG. 1D, a support fame 120 is still provided to cover a rear side of the flat panel loudspeaker 100. However, in FIG. 1D, the exciter 150 is self-supporting and attaches to the rear surface of the resonant panel 110, and thus the mounting portion 125 of the support frame 120 for supporting the exciter 150 may be omitted. In another example, the support frame 120 may be omitted completely.

In another example, as shown in FIG. 1E, the support frame 120 may comprise a foam backing, which substantially surrounds the exciter 150 to thereby protect the exciter 150 and provide reduced support to the exciter 150. In the example of FIG. 1E, the exciter 150 may be a partially self-supporting exciter, and may not be fully self-supporting, but may require reduced support provided by the foam. The foam may be any suitable type of light-weight foam, and may be applied to the rear surface of the resonant panel 110 to substantially surround the exciter 150 and thus provide support to the exciter 150. In some examples, the foam backing may comprise a foam pad bonded to the rear of the resonant panel and having sufficiently low density so as to have negligible damping and stiffening effects on the resonant panel 110, but which is capable of supporting the exciter 150 in its position. It should be understood that other lightweight structures may be provided to provide support to the exciter 150, while having a reduced structure compared to the rigid support frame 120 of FIG. 1C.

Advantageously, a weight and bulkiness of the flat panel loudspeaker 100 may be reduced by omitting at least a part of the support frame 120 when the exciter 150 is a self-supporting exciter or partially self-supporting exciter, optionally supported by a light-weight foam.

Advantageously, the flat panel loudspeaker 100 may be mostly received within the opening in the mounting surface, and only the resonant panel 110 may be visible from outside of the mounting surface. Thus, when the resonant panel 110 is covered with the wall coating, the flat panel loudspeaker 100 may become substantially invisible.

Figure 2A:
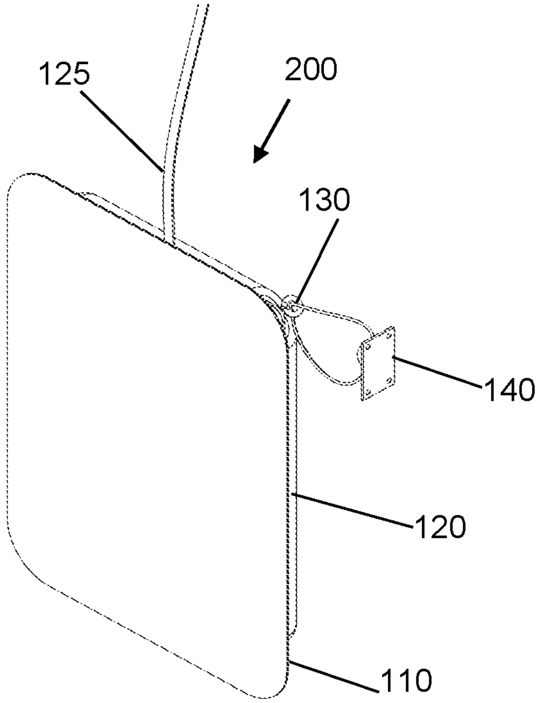
FIG. 2A shows a view of a front side of a flat panel loudspeaker according to an embodiment of the present invention.
Figure 2B:
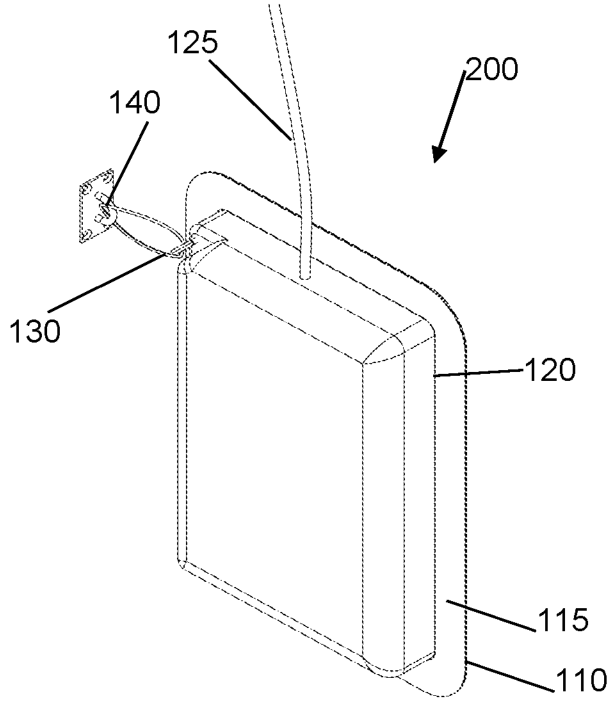
FIG. 2B shows a view of a rear side of the flat panel loudspeaker of FIG. 2A.

FIGS. 2A and 2B show a similar flat panel loudspeaker 200 as the flat panel loudspeaker 100 of FIG. 1. Thus, description of common features is omitted. However, it should be understood that where description of common features is omitted, the flat panel loudspeaker 200 of FIGS. 2A and 2B does include the features of the flat panel loudspeaker 100 of FIG. 1 described above. However, the flat panel loudspeaker 200 of FIGS. 2A and 2B differs from the flat panel loudspeaker 100 of FIG. 1 in that it further comprises fixing means 130 extending from a rear surface of the mounting unit of the flat panel loudspeaker 200 configured to couple to an interior element 140 of the mounting surface.

In the example shown in FIGS. 2A and 2B, the fixing means 130 comprises an extending element such as a ring or band configured to engage with corresponding means on the interior element 140 of the mounting surface, shown as a hook in FIGS. 2A and 2B. However, it should be understood that alternative fixing means 130 may be provided to engage with alternative interior elements 140 of the mounting surface. In particular, any suitable fixing means may be provided to engage with corresponding interior elements 140 of the mounting surface. In some examples, this may include engaging teeth, slots, or magnetic elements. However, it should be understood that the present application is not limited thereto, and many suitable further means can be envisaged.

It should be understood that the fixing means 130 is an optional secondary or backup safety fixing which may be optionally provided to a flat panel loudspeaker 200 such as the loudspeaker of FIG. 1. For example, the fixing means 130 may be particularly beneficial when the flat panel loudspeaker 200 is installed in an environment where the flat panel loudspeaker 200 or the mounting surface is subject to increased risk of displacement from the mounting surface. For example, one such environment may be an earthquake zone area. That is, the fixing means 130 may be included when the flat panel loudspeaker 200 is installed in a building in an earthquake prone area. In another example, the fixing means 130 may be optionally included depending on the mounting surface where the flat panel loudspeaker is to be installed. For example, the fixing means 130 may be advantageously included when installing the flat panel loudspeaker in a ceiling void, so as to prevent the flat panel loudspeaker from falling if the coupling between the mounting surface and the edge portion 115 of the resonant panel 110 is compromised.

Figure 3:
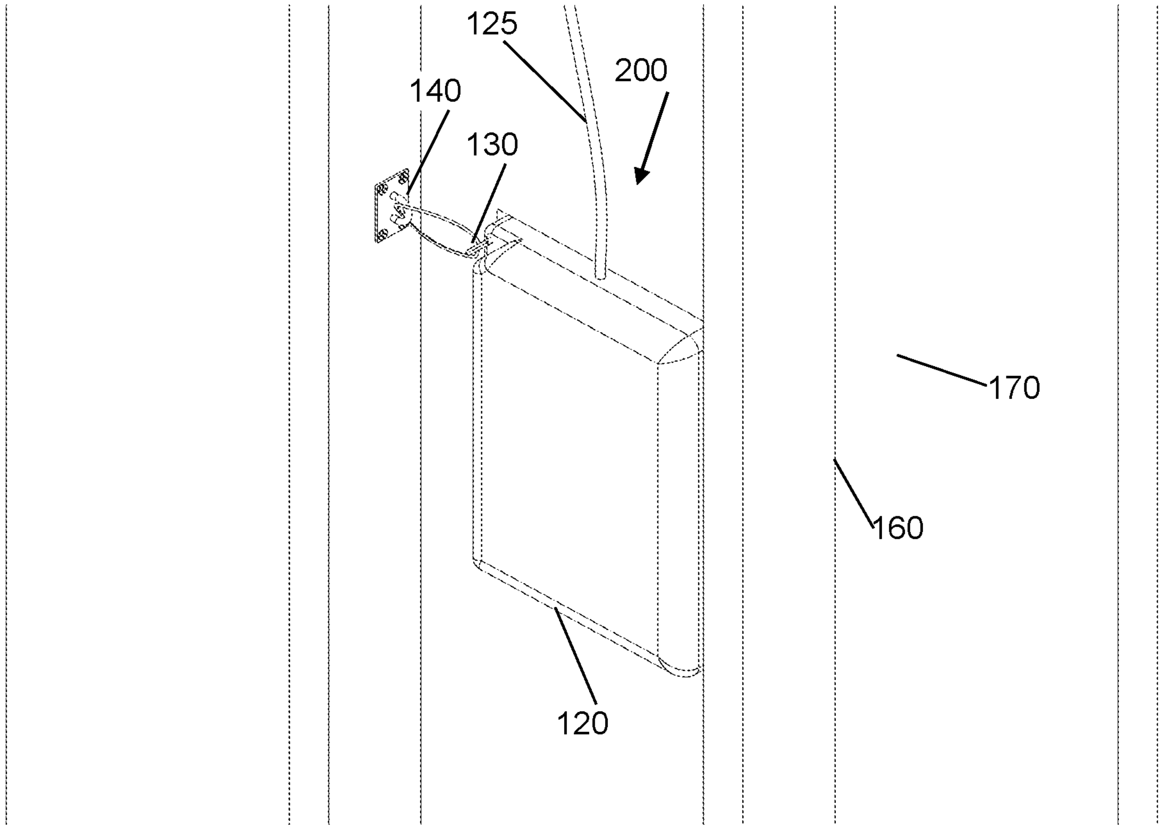
FIG. 3 shows a representation of the flat panel loudspeaker of FIGS. 2A and 2B installed in a mounting surface.

FIG. 3 illustrates the flat panel loudspeaker 200 of FIGS. 2A and 2B located in the opening in the mounting surface 170. While FIG. 3 illustrates an example showing the flat panel loudspeaker 200 of FIGS. 2A and 2B including the fixing means 140, it should be understood that the description of FIG. 3 may be equally combined with the flat panel loudspeaker 100 of FIG. 1, omitting the fixing means 140.

In the example of FIG. 3, the mounting surface 170 includes a stud wall in which supporting studs 160 are arranged in a parallel frame and sheets such as plasterboard are attached on either side of the stud 160 frame to provide a mounting surface 170. It should be understood that the studs 160 may provide structural support to a surface such as a wall, and sheets such as plasterboard attached to cover the studs 160 and the gaps between the studs 160 may define the surface of the mounting surface. However, it should also be understood that while FIG. 3 explains the mounting of the flat panel loudspeaker 200 in a wall surface, the flat panel loudspeaker 200 may be mounting in other types of surfaces, such as floors or ceilings, in a similar manner.

It should be understood that as the flat panel loudspeaker 200 is shown mounted in the opening, the opening cannot be seen in FIG. 3. However, the opening may comprise a hole in the mounting surface 170, which may be cut out of the mounting surface 170 or may be formed by leaving a gap when assembling the sheets onto the studs 160. The opening may be formed to have similar proportions to the flat panel loudspeaker 200 and in particular to the resonant panel 110. However, the opening may be sized so as to be smaller than the resonant panel 110 by approximately the width of the edge portion 115 of the resonant panel 110, such that when the flat panel loudspeaker 200 is inserted into the opening, the edge portion 115 of the resonant panel 110 is pressed against the mounting surface 170 surrounding the opening, or on one or more sides of the opening, and the rest of the flat panel loudspeaker 200 including the support frame 120, the cable 125 and the exciter are received within the opening.

The flat panel loudspeaker 200 may then be fixed to the mounting surface 170 by the coupling means provided on the rear surface of the edge portion 115 of the resonant panel 110 as described above. Optionally, the flat panel loudspeaker 200 may be further secured by the fixing means 130. As explained above, in some examples, the coupling means provided on the rear surface of the edge portion 115 of the resonant panel may comprise one or more of adhesive, self-adhesive tape, or an opening engageable by a fastener to couple the edge portion 115 to the mounting surface 170, to thereby secure the flat panel loudspeaker 200 in the opening.

In the example shown in FIG. 3, the interior element 140 of the mounting surface 170 comprises engaging means such as a hook fastened to one of the studs 160. Advantageously, the wall studs 160 are resilient to movement and provide structural support to the mounting surface 170. Advantageously, by providing the fixing means 130 to couple with the interior element 140 provided on a structural support of the mounting surface 170, the flat panel loudspeaker 200 may be more firmly secured in the opening and resistant to movement.

It should be understood that the flat panel loudspeaker 200 shown in FIGS. 2 to 3 may also omit the support frame 120 as discussed above in respect of FIG. 1.

FIGS. 4A and 4B illustrate another flat panel loudspeaker 400 according to an embodiment of the present invention. The flat panel loudspeaker 400 of FIGS. 4A and 4B comprises similar parts and operates similarly to the flat panel loudspeakers 100, 200 of FIGS. 1 and 2, and thus description of common parts is omitted. However, it should be understood that unless specifically stated, the description of features of the flat panel loudspeakers 100, 200 of FIGS. 1 and 2 applies to corresponding features of the flat panel loudspeaker 400 of FIGS. 4A and 4B. FIG. 4A shows a perspective view of the flat panel loudspeaker 400 and FIG. 4B shows cross-sectional views of the flat panel loudspeaker 400 when installed in the mounting surface 170. The flat panel loudspeaker 400 of FIGS. 4A and 4B comprises a planar resonant panel 410 including an active area and an edge portion 415, a support frame 420, fixing means 430 and an exciter (not shown). The flat panel loudspeaker 400 may produce audio through operation of the exciter driving the resonant panel 410 to vibrate. The flat panel loudspeaker 400 may be a distributed mode loudspeaker. The active area of the resonant panel 410 may have an outer boundary beyond which the resonant panel 410 does not substantially vibrate, due to one or more of the support frame 420 defining the outer boundary or the edge portion 415 being damped by its contact with the mounting surface. It should be understood that as with FIG. 1 discussed above, the support frame 420 may take a different form to that shown in FIG. 4 or may be omitted.

The flat panel loudspeaker 400 of FIGS. 4A and 4B differs from the flat panel loudspeakers 100, 200 of FIGS. 1 and 2 in that the flat panel loudspeaker 400 of FIGS. 4A and 4B is substantially circular, and includes alternative fixing means 430. That is, the resonant panel 410 and the support frame 420 of the flat panel loudspeaker 400 of FIGS. 4A and 4B are substantially circular. As shown in FIG. 4B, the flat panel loudspeaker 400 of FIG. 4B is configured for installation in a horizontal mounting surface such as a ceiling.

As shown in FIG. 4A, the resonant panel 410 is substantially circular, and planar, and extends beyond a boundary of the support frame 420 so as to define an active area within the boundary of the support frame 420 and an edge portion 415 of the resonant panel 410. The edge portion 415 of the resonant panel 410 of FIG. 4A may be substantially the same as the edge portion 115 of the resonant panel 110 of FIGS. 1 and 2 other than in shape, and the rear surface of which may be configured to mount to a mounting surface in the same way. Further, the front surface of the resonant panel 410 or the edge portion 415 thereof may be configured to adhere to a wall coating such as plaster or paint, in the same way as described above. Alternatively, as discussed below, the resonant panel 110 may omit the coupling means for coupling to the mounting surface 170, and/or may omit means on the front surface to adhere to the wall coating.

As shown in FIGS. 4A and 4B, the flat panel loudspeaker 400 of FIGS. 4A and 4B comprises fixing means 430 for further coupling to a mounting surface 170. In the example of FIG. 4, the mounting surface 170 is a horizontal, raised surface, such as a ceiling. In this example, the flat panel loudspeaker 400 may be provided within an opening in the mounting surface 170 and coupled to the mounting surface 170 by means provided on the rear surface of the edge portion 415 of the resonant panel 410 as described above, and further supported in the opening by the fixing means 430. While the fixing means 130 of FIG. 2 are shown as a loop which engages with a hook provided within the mounting surface 170, in the flat panel loudspeaker 400 of FIGS. 4A and 4B, the fixing means 430 is shown as a plurality of clips. In this example, the clips may be spring loaded clips attached to the rear of the resonant panel 410 or the support frame 420 and configured to resiliently engage a rear or interior surface of the mounting surface 170, as shown in FIG. 4B. The clips may be biased so as to exert a force on the mounting surface 170 when the flat panel loudspeaker 400 of FIGS. 4A and 4B is installed, to thereby support the flat panel loudspeaker 400 in the opening. The fixing means 430 may be configured such that the flat panel loudspeaker 400 may be easily installed and removed from the mounting surface 170. For example, the fixing means 430 may comprise the spring loaded clips which secure the flat panel loudspeaker 400 in place, but which may be bent back by the action of a user to remove the flat panel loudspeaker 400 from the opening.

Although not shown in FIGS. 4A and 4B, it should be understood that the flat panel loudspeaker 400 of FIGS. 4A and 4B may comprise an exciter and a cable similar to those shown in FIGS. 1 to 3. The exciter may be optionally self-supporting or a partially self-supporting exciter as explained above. It should be understood that as such, the support frame 420 of the flat panel loudspeaker 400 of FIG. 4 may vary in design. For example, the support frame 420 may be omitted, reduced in size or replaced with a foam pad surrounding the exciter depending on the type of exciter used.

It should be understood that the resonant panel 410 of the flat panel loudspeaker 400 of FIGS. 4A and 4B may comprise the coupling means on the rear surface of the resonant panel 410, or on the edge portion 415 of the rear surface of the resonant panel 410, similar to the coupling means discussed in respect of FIGS. 1 to 3, or the coupling means may be omitted. For example, the flat panel loudspeaker 400 may be secured in the mounting surface, such as a ceiling, by the fixing means 430 such as the resiliently biased springs alone, and the coupling means on the rear surface of the resonant panel 410 may be omitted. In this case, the flat panel loudspeaker 400 may be easily removable and replaceable, and thus maintenance of the flat panel loudspeaker 400 may be simplified, and access to an interior of the mounting surface may be enabled by removing the flat panel loudspeaker 400. The edge portion 415 of the resonant panel 410 may still overlap the edge of the opening and a portion of the mounting surface, such that when the flat panel loudspeaker 400 is mounted in the opening, the edge portion 415 (and optionally the whole of the resonant panel 410) may be covered with a wall coating such as paint, and may be hidden from view.

In another example, the resonant panel 410 may include coupling means on the rear surface of the edge portion 415 for securing the flat panel loudspeaker 400 in the opening of the mounting surface. The coupling means may be the same as those described earlier in respect of FIGS. 1 to 3, or may comprise coupling means which facilitate easy removal of the flat panel loudspeaker 400 from the opening, while still coupling the resonant panel 410 to the mounting surface and thus damping the edge portion 415 and preventing the edge portion 415 from substantially vibrating, thereby defining the active portion of the resonant panel 410. In this example, the coupling means may comprise, for example, adhesive tape or glue which does not fully set and which enables the coupling of the resonant panel 410 to the mounting surface to be removed. The edge portion 415 of the resonant panel 410 may still contact the mounting surface when installed and thus contribute to defining the outer boundary of the active portion of the resonant panel 410 in use.

It should also be understood that the front surface of the resonant panel 410 may comprise means for bonding with a wall coating, as discussed above in respect of FIGS. 1 to 3, or such means may be omitted. For example, if the means for bonding with the wall coating are omitted, visibility of the flat panel loudspeaker 400 may still be reduced when installed in the mounting surface, due to the thin section of the resonant panel 410 which overlaps the mounting surface (i.e., the edge portion 415). As the edge portion 415 is thin with respect to the resonant panel 410 and/or a typical thickness of coating applied to the mounting surface, the flat panel loudspeaker 400 may still be made inconspicuous. For example, the edge portion 415 may be painted the same or similar color as a surrounding portion of the mounting surface, and thus may be difficult to visually perceive. Thus, even if the flat panel loudspeaker 400 is not configured to adhere to a coating of wall plaster, and is instead painted, the flat panel loudspeaker 400 may still be difficult to perceive due to the thin edge portion 415 of the resonant panel 410 which overlaps the mounting surface around the opening. In this case, the surface of the resonant panel 410 may be smooth. It should be understood that the flat panel loudspeaker 400, and particularly the resonant panel 410, may otherwise be coated to distinguish and highlight the flat panel loudspeaker 400 from the mounting surface, such as through the use of a contrasting color.

It should be understood that while FIG. 4 describes a circular flat panel loudspeaker 400 for mounting into a surface such as a ceiling, the circular flat panel loudspeaker 400 may alternatively be mounted into a vertical mounting surface such as a wall, in a similar manner as described in respect of FIGS. 1 to 3. Likewise, the rectangular flat panel loudspeaker 100, 200 of FIGS. 1 to 3 may also be mounted in a ceiling. It should be understood that the type of fixing means, if used, may be selected based on the type of mounting surface.

It should also be understood that the flat panel loudspeaker 400 of FIGS. 4A and 4B may operate in substantially the same way as the flat panel loudspeakers 100, 200 of FIGS. 1 to 3, and may comprise an exciter (self-supporting or otherwise) for driving the resonant panel 410 to produce and output sound under the control of a controller. In particular, the resonant panel 410 comprises an active portion which is defined by an outer boundary beyond which the transmission of energy is prevented. The outer boundary may be defined by a position of the support frame 420, or by coupling of the edge portion 415 to the mounting surface.

Advantageously, the flat panel loudspeaker 400 may be mostly received within the opening in the mounting surface, and only the resonant panel 410 may be visible from outside of the mounting surface. Thus, when the resonant panel 410 is covered with the wall coating, the flat panel loudspeaker 100 may become substantially invisible.

Figure 5:
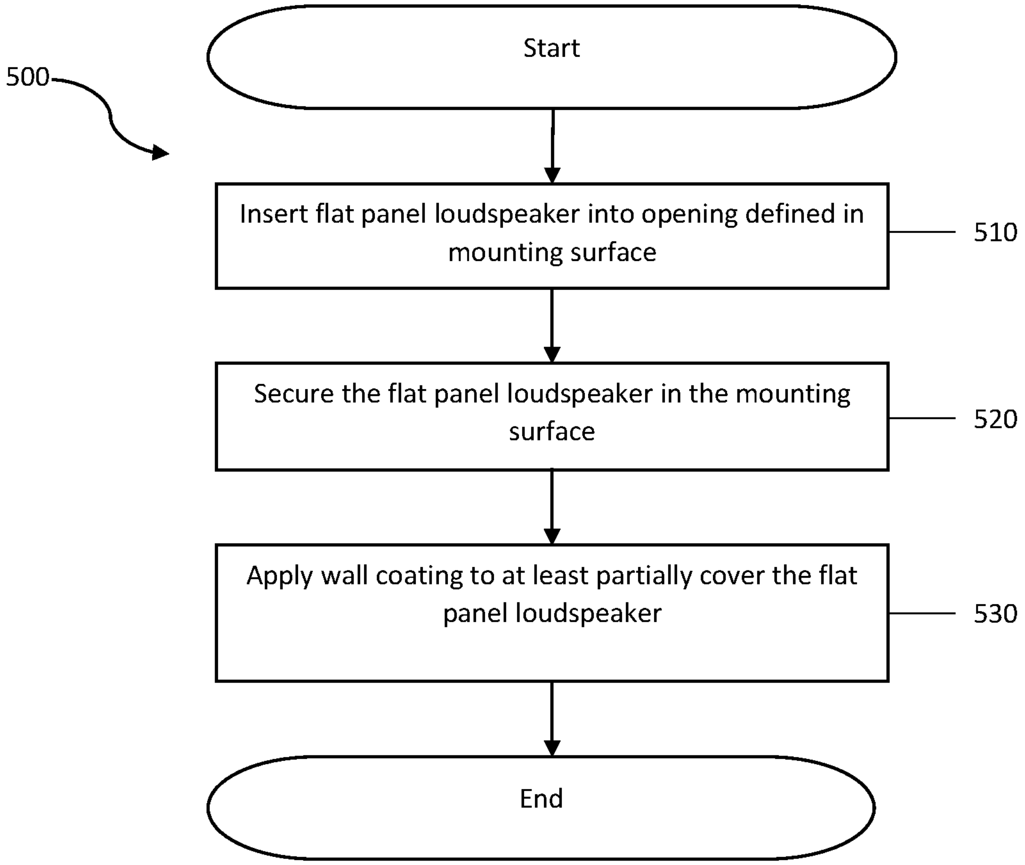
FIG. 5 shows a flowchart illustrating a method of installing the flat panel loudspeaker of any of FIGS. 1 to 4 in accordance with an embodiment of the present invention.

FIG. 5 illustrates a method 500 for installing a flat panel loudspeaker into an opening of a mounting surface according to an embodiment of the invention. The method 500 may be a method of installing the flat panel loudspeaker 100, 200, 400 according to any of FIGS. 1 to 4, and may be for installing the flat panel loudspeaker 100, 200, 400 into a mounting surface 170 such as that described earlier. For example, the mounting surface may be the mounting surface 170 of FIG. 3 or 4 and comprise a stud wall where planar sheets such as plasterboard are attached to structural beams or studs 160, or a ceiling as in FIG. 4B, for example.

At step 510, the method comprises inserting the flat panel loudspeaker into an opening defined in a mounting surface. The flat panel loudspeaker may be inserted into the opening by physically holding the flat panel loudspeaker and moving the flat panel loudspeaker toward the opening. The opening and the flat panel loudspeaker may be sized such that the flat panel loudspeaker is substantially received within the opening while an edge portion of a resonant panel of the flat panel loudspeaker is pressed against and sits substantially flush with an area of the mounting surface surrounding the opening on at least one side. The flat panel loudspeaker may be moved by an installer such as a person, and it should be understood that the method 500 may be performed by a person without requiring particular expertise or equipment.

Optionally, the method 500 may further comprise forming the opening before inserting the flat panel loudspeaker into the opening in step 510. The opening may be formed by cutting, sawing or otherwise forming the opening in an existing mounting surface, or may be formed when the mounting surface is assembled. It should be understood that a shape of the opening may be determined so as to correspond to a shape of the flat panel loudspeaker.

At step 520, the method comprises securing the flat panel loudspeaker in the mounting surface, and more specifically in the opening. The flat panel loudspeaker may be secured in the mounting surface by the coupling means provided on the rear of the edge portion of the resonant panel as discussed above. For example, the flat panel loudspeaker may be held in position with a biasing force applied to press the flat panel loudspeaker against the surface of the mounting surface so as to encourage the coupling means to couple the flat panel loudspeaker to the mounting surface.

Depending on the type of coupling means provided, the method 500 may comprise a step of preparing the mounting surface and/or the flat panel loudspeaker before inserting the flat panel loudspeaker in the opening or securing the flat panel loudspeaker. For example, the method 500 may comprise a step of cleaning an area of the mounting surface surrounding the opening so as to remove dirt or imperfections which may weaken the coupling of the coupling means.

In some examples, the coupling means comprise one or more of adhesive, self-adhesive tape, or means for engaging with a corresponding fastener on the mounting surface. Thus, the method 500 may optionally comprise a step of preparing the coupling means for adhesion to the mounting surface. For example, where the coupling means is self-adhesive tape provided on the rear surface of the edge portion of the resonant panel, the method 500 may comprise removing a paper cover of the self-adhesive tape to expose adhesive provided therein, before the flat panel loudspeaker is inserted into the mounting surface.

Optionally, step 520 may further comprise engaging a further fixing means as shown in FIGS. 2 to 4 with an interior element of the mounting surface. For example, the fixing means may comprise an extending member shaped to engage with a corresponding member on the interior element. For example, as shown in FIG. 3, the fixing means may comprise a ring or band configured to engage with a hook provided on a structural beam of the mounting surface. In another example, as shown in FIG. 4B, the fixing means may comprise spring loaded clips biased so as to exert a force against the mounting surface to thereby support the flat panel loudspeaker in the opening. It should be understood that the present invention is not limited to these examples, and other types of fixing means may be used.

The method may further comprise connecting the cable 125 to the flat panel loudspeaker 100, 200, 400. The cable 125 may be separately routed behind the mounting surface before being connected to the flat panel loudspeaker 100, 200, 400.

At step 530, the method 500 comprises applying a wall coating to at least partially cover the flat panel loudspeaker. In one example, the wall coating is only applied over the edge portions of the resonant panel, so as to cover the edge portion of the resonant panel and hide from view the attachment of the resonant panel to the mounting surface. In another example, all of the resonant panel is covered with the wall coating to hide the flat panel loudspeaker from view. As discussed above, the front surface of the resonant panel may be provided with surface features for improving adhesion of the wall coating to the resonant panel. The wall coating may include one or more coatings, and may include a plaster skim and/or paint. The wall coating may be applied at a typical depth as on a normal mounting surface omitting the flat panel loudspeaker, for example at a depth of 2-3 mm. Thus, the flat panel loudspeaker inserted into the opening may adhere to the mounting surface by the coupling means provided on the rear surface of the edge portion of the resonant panel, and may be made substantially invisible by the application of wall coating to the flat panel loudspeaker.

Advantageously, as the edge portion of the resonant panel is thin (and of a similar thickness to a typical thickness of wall coating applied to the mounting surface) and designed to include coupling means on the rear surface and means for improving adhesion of the wall coating on the front surface, the edge portion of the resonant panel may sit substantially flush with the mounting surface when installed. Further, the wall coating may adhere and dry on to the resonant panel without substantial shrinking, and thus the boundary between the edge portion of the resonant panel and the mounting surface may be made substantially invisible.

Advantageously, the coupling means provided on the rear surface of the edge portion of the resonant panel allow for a simple installation by a lay person without requiring any specialist tools or skills.

Optionally, the method 500 may further comprise applying joint tape over a seam between the edge portion of the resonant panel and the mounting surface to thereby strengthen the mounting of the flat panel loudspeaker further, but it should be understood that this is not necessary for the mounting of the flat panel loudspeaker.

Figure 6:
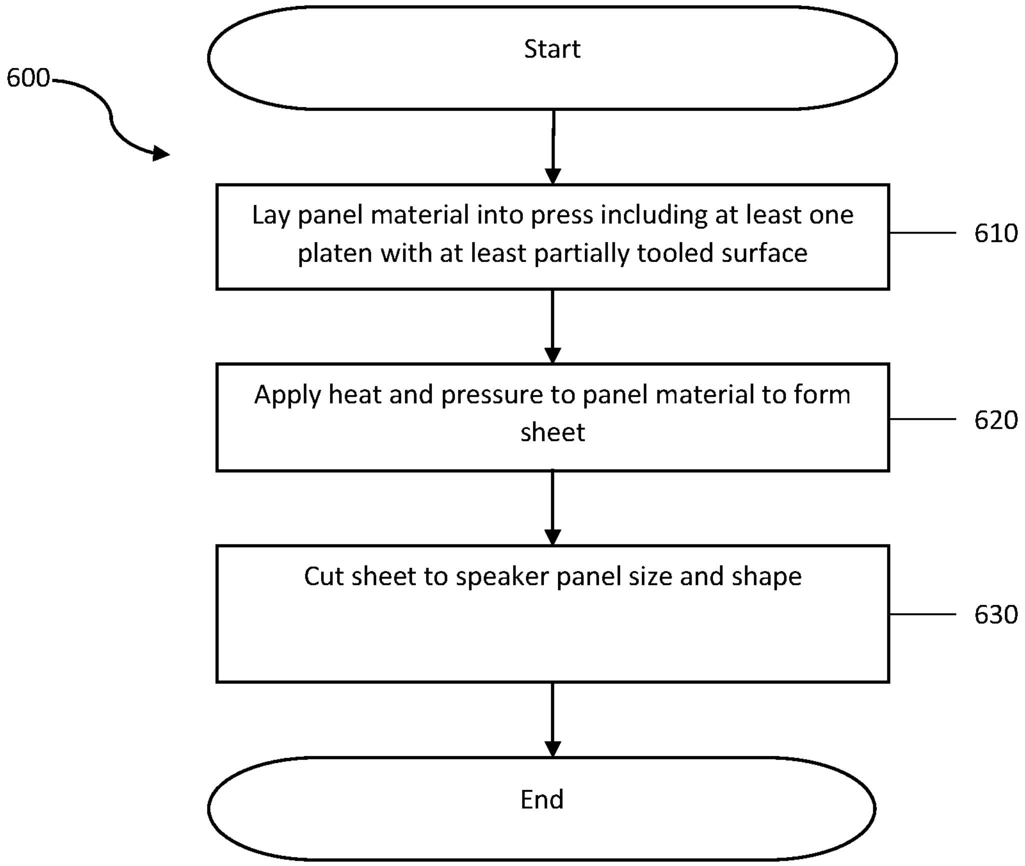
FIG. 6 shows a flowchart illustrating a method of manufacturing the flat panel loudspeaker of any of FIGS. 1 to 4 in accordance with an embodiment of the present invention.

FIG. 6 illustrates a method 600 for manufacturing a flat panel loudspeaker according to an embodiment of the invention. The method 600 may be a method for manufacturing a flat panel loudspeaker according to any of FIGS. 1 to 4.

At step 610, the method 600 comprises laying panel material into a press including at least one platen with an at least partially tooled surface. For example, the panel material may comprise raw material for forming the resonant panel discussed above, and may include the same materials as already discussed. In examples where the method is for manufacturing a flat panel loudspeaker comprising a monolithic panel, the panel material may include one or more of Kevlar, synthetic fiber, natural fiber, glass, carbon fiber, or a carbon-nanotube resin. The panel material may be laid in layers or woven. Whilst an embodiment is described here in relation to a monolithic panel, it will be appreciated that the disclosure is not limited to this, and in some embodiments, the method is for manufacturing a flat panel loudspeaker comprising a composite panel. This will be described in more detail in relation to FIGS. 7, 8A and 8B.

The press may include opposing platens between which the panel material is to be pressed. As noted above, one or more of the platens may include an at least partially tooled surface. The at least partially tooled surface may be designed so as to create the resonant panel having the front surface configured to adhere to the wall coating as discussed above. That is, the at least one platen having the at least partially tooled surface may be designed so as to create a rough texture or varying surface relief including ridges or perforations on the surface of the resonant panel as described above with reference to FIGS. 1 to 4. The opposing platen may have a smooth surface.

In embodiments where the method is for manufacturing a flat panel loudspeaker comprising a resonant panel formed to be a monolith, the panel material may otherwise be known as a prepreg, and may be produced from multiple thin layers of the panel materials discussed above, which may be one or more of woven or laid in strands.

Optionally, the layers of the panel material may be laid in different orientations, which advantageously may allow the resonant panel when formed to be similarly stiff in all directions.

Optionally, the tooled surface of the platen may be designed so as to impart a varied texture across the surface of the panel material, or may impart a uniform or consistent texture. In one example, the surface of the platen may be tooled so as to impart a different texture in a particular region of the panel for displaying a logo or an image.

At step 620, heat and pressure may be applied to the press and the panel material to form a sheet. In embodiments where the method is for manufacturing a flat panel loudspeaker comprising a resonant panel formed to be a monolith, the heat and pressure applied to the press cause the panel material to form a monolithic sheet. It should be understood that while the term "monolithic" is used to mean that the sheet is formed as a single body, the sheet may also be a composite sheet formed of multiple layers which are strongly bonded together.

The press may be heated to between approximately 100C to 200C, or preferably between 140C and 150C, to form the sheet. Pressure may also be applied to the panel material at the same time as the press is heated. When the panel material comprises prepreg, for example in embodiments where the method is for forming a monolith panel, the heat and pressure cause the prepreg to thermoset into the solid sheet, with one smooth side and one side having a surface corresponding to the tooled surface of the platen. For example, the one side having the surface corresponding to the tooled surface of the platen is formed to have a rough, textured surface designed to encourage bonding with wall plaster, as discussed above. The rear surface of the resonant panel is formed to be substantially smooth, so as to promote bonding of an adhesive film to the rear surface of the resonant panel when coupling the exciter to the resonant panel. It will be understood that "substantially smooth" may include a smooth surface, but may have a very fine textured surface adapted for acrylic film adhesives to be laid thereon for adhering the exciter to the rear surface of the panel.

As noted above, the resonant panel may be formed to have a varying thickness. This may be achieved by shaping the platens to define areas of different thickness. As explained above however, the resonant panel is formed to have a substantially planar front surface corresponding to the rough surface described above, so as to enable the flat panel loudspeaker to sit flush with the mounting surface and to improve adhesion with the wall coating. Therefore, variations in thickness of the resonant panel may only be visible on the rear surface of the resonant panel.

At step 630, the sheet is cut to a desired size and shape for forming the resonant panel of the flat panel loudspeaker. In particular, the sheet may be cut to a substantially rectangular, substantially triangular or substantially circular shape, but it should be understood that other shapes are possible. Advantageously, the press may be used to produce sufficient sheet material to form multiple resonant panels at the same time, which are then able to be cut to form any size or shape of resonant panel for a correspondingly sized flat panel loudspeaker.

The method 600 may further comprise attaching one of more of an exciter, support frame or mounting unit to the resonant panel after the sheet is cut to form the resonant panel. The exciter, support frame or mounting unit may be attached to the rear, smooth surface of the resonant panel. It should be understood that the support frame and mounting unit are optional, as discussed above.

The method 600 may also comprise, after cutting the sheet to form the resonant panel, attaching the coupling means to the rear surface of the edge portion of the resonant panel, as described earlier. For example, self-adhesive tape, an adhesive layer, or engaging or fastening means may be attached to the rear surface of the edge portion of the resonant panel.

The method 600 may further comprise applying a coating to the front surface of the resonant panel designed to improve bonding with the wall coating. For example, a synthetic primer may be provided to the textured front surface of the resonant panel to improve bonding with a wall plaster applied to the resonant panel after installation. However, the disclosure is not limited to this, and in some examples, a paper skin layer may alternatively be applied, in which case, it should be understood that the press used for the method 600 of FIG. 6 may alternatively include two smooth platens.

Figure 7:
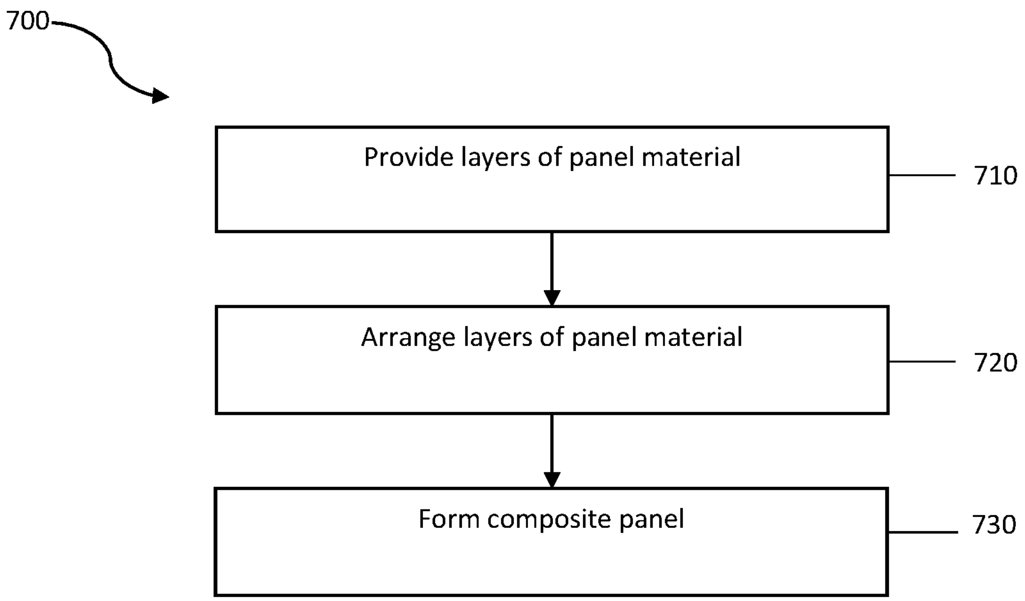
FIG. 7 shows a flowchart illustrating a method of forming a composite panel of a flat panel loudspeaker in accordance with an embodiment of the present invention.

FIG. 7 shows a flowchart illustrating a method 700 for manufacturing a flat panel loudspeaker including a composite resonant panel according to an embodiment of the invention. The method 700 may be a method for manufacturing a flat panel loudspeaker according to any of FIGS. 1 to 4.

At step 710, the method comprises providing layers of panel material. Optionally, the method 700 may comprise producing the layers of panel material to provide the layers of panel material (step 710). The method comprises providing at least three layers, including a first skin layer, a second skin layer and a core layer for a composite panel. Optionally, first and second adhesive layers may also be provided.

At step 720, the method 700 comprises arranging the layers of the panel material. In particular, the method comprises arranging the core layer between the first skin layer and the second skin layer. In examples where adhesive layers are also provided, the first adhesive layer may be arranged between the core layer and the first skin layer, and the second adhesive layer may be arranged between the core layer and the second skin layer.

At step 730, the method 700 comprises forming a composite panel. The step 730 may include the steps 610, 620 and 630 described in relation to FIG. 6 above. For example, step 730 may comprise step 610 of laying the arranged layers of the panel material into the press, step 620 of applying heat and pressure to the arranged layers to form a composite sheet, and step 630 of cutting the composite sheet to the loudspeaker panel shape and size, as described above, so as to form a composite panel.

Regarding step 710, the layers may be provided with suitable materials, as follows: In some examples, the first and second skin layers may be provided as a prepreg or the core may be provided as a prepreg. For example, a first prepreg may be provided for the first skin layer, a second prepreg for the second skin layer and a pre-manufactured substrate for the core layer. The pre-manufactured substrate may be substantially chemically and structurally insensitive to heat pressing. It will be appreciated that "substantially chemically and structurally insensitive to heat pressing" will be understood in the art as being substantially chemically and structurally the same or unchanged at high temperature and pressing manufacture conditions, for example at temperatures up to 200C. In some other examples, a first pre-manufactured substrate may be provided as the first skin layer, a second pre-manufactured substrate for the second skin layer and a prepreg for the core layer. In such examples where the layers include at least one prepreg layer, this means that when the arranged layers are laid into the press as described above, this causes the prepreg to bond with the pre-manufactured substrate(s) so as to form the composite sheet. Advantageously, the prepreg may sufficiently bond the composite layers together, without requiring additional adhesive layers for attaching the core to the first and second skins. Optionally however, adhesive layers may be introduced to further bond the layers together. The composite sheet may then be cut to form the composite panel as described in the above example.

In other examples, step 710 of providing the layers of panel material comprises providing (and optionally producing) three pre-manufactured substrates, and an additional two adhesive layers. In such examples, the method comprises arranging a first adhesive layer between a first and second of the pre-manufactured substrates and a second adhesive layer between the second and third of the pre-manufactured substrates and laying the arrangement in the press as described in the above example to cause the adhesive to adhere the three pre-manufactured substrates together so as to form the composite sheet. The composite sheet may then be cut to form the composite panel as described in the above example.

The first and second skins may be formed of at least one layer comprising at least one of carbon fiber, a carbon-nanotube resin, layered glass, one or more synthetic fibers (such as Kevlar), resin impregnated synthetic fiber based material, or one or more natural fibers (such as hemp). The fibers of the first skin and the second skin may be woven, or laid in parallel strands and not woven. The layers of the first skin and the second skin may optionally be laid in different orientations in order to allow the resulting resonant panel to be similarly stiff in all directions. The first skin and the second skin may comprise at least one layer of a suitable solid plastic sheet material (such as acetate or mylar), paper and/or a hybrid of said fibers.

The core may comprise one of a synthetic or natural-based foam, wood (such as balsa wood), metallic honeycomb (such as aluminum), resin-dipped paper-based honeycomb, carbon (such as graphene), metal or a lightweight plastics-based webbed structure, which may be formed by deposition, etching, extrusion, molding or additive printing processes.

In examples where the core comprises a foam core, the core may be formed of a polymethacrylimide (PMI) foam (such as Rhoacell), a polyvinyl chloride (PVC) foam, other synthetic hydrocarbon foam, or a woven and/or non-woven fiber-based foam, such as phenolic, melamine formaldehyde or other resin-based glass fiber foamed core.

In examples where the composite panel includes adhesive layers, the adhesive layers may be formed of a suitable adhesive. It will be appreciated that a chemically-suitable adhesive in the art adapted to the composition of the layers may be used.

Advantageously, by forming the resonant panel as a composite panel, the resonant panel may be formed to be lightweight and very thin, so as to improve the sensitivity response of the resonant panel to vibrate, thereby improving the efficiency of the loudspeaker.

Figure 8A:
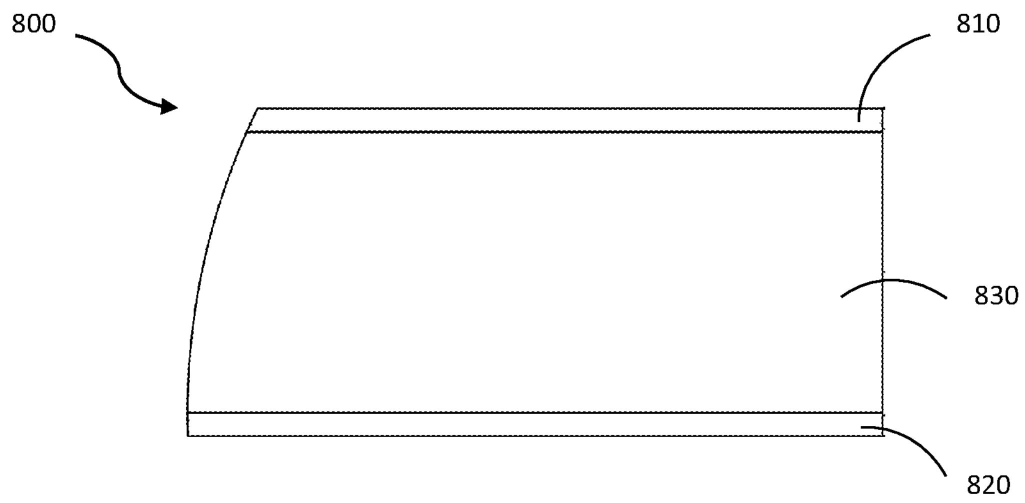
FIG. 8A shows a cross-sectional view of a composite panel in accordance with an embodiment of the present invention.

FIG. 8A shows an example of an edge portion 800 of a composite panel of a flat panel loudspeaker. The composite panel may be manufactured as described above in relation to the method of FIG. 7.

The composite panel comprises the active portion and the edge portion 800 as a continuous panel. The composite panel comprises a first skin 810, a second skin 820, and a core 830 between the first skin 810 and the second skin 820. Advantageously, by forming the resonant panel as a composite panel, the resonant panel may be formed to be lightweight and very thin, so as to improve the sensitivity response of the resonant panel to vibrate, thereby improving the efficiency of the loudspeaker.

Figure 8B:
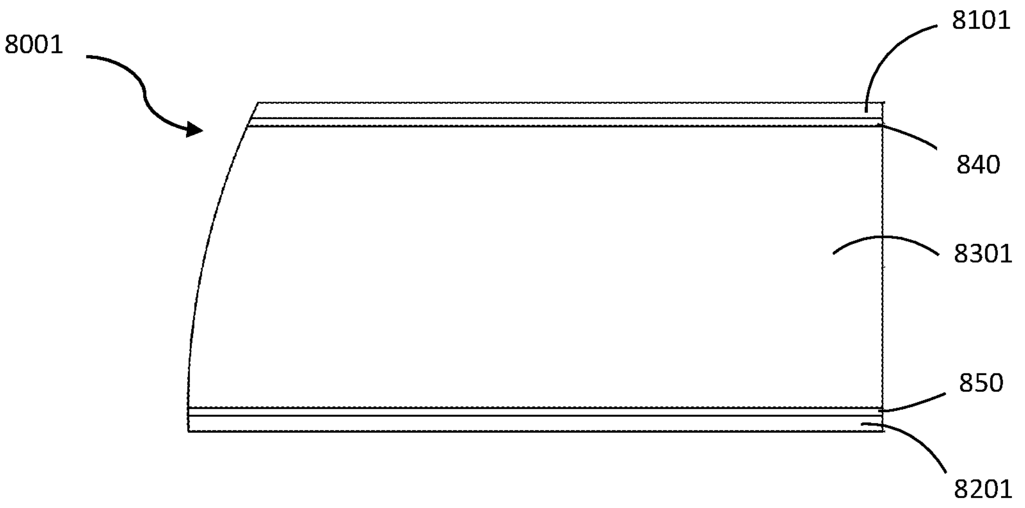
FIG. 8B shows a cross-sectional view of a composite panel in accordance with another embodiment of the present invention.

FIG. 8B shows an example of an edge portion 8001 of a composite panel of a flat panel loudspeaker according to another embodiment. The composite panel may be manufactured as described above in relation to the method of FIG. 7. In the embodiment of FIG. 8B, the composite panel 8001 includes the same elements as the composite panel 800, which are denoted by the same reference signs with a suffixed “1”, such that the disclosure in relation to FIG. 8A above applies to FIG. 8B. In particular, the composite panel 8001 comprises a first skin 8101, a second skin 8201, and a core between the first skin 8101 and the second skin 8201. However, the embodiment of FIG. 8*b* differs from FIG. 8A in that the composite panel 8001 additionally comprises adhesive layers 840, 850. In particular, the first adhesive layer 840 is arranged between the first skin 8101 and the core 8301, so as to couple the first skin 8101 and the core 8301 together via adhesion. The second adhesive layer 850 is arranged between the second skin 8201 and the core 8301, so as to couple the second skin 8201 and the core 8301 together via adhesion.

Throughout the description and claims of this specification, the words “comprise” and “contain” and variations of them mean “including but not limited to”, and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader’s attention is directed to all papers and documents which are filed concurrently with or previous to this specification in connection with this application and which are open to public inspection with this specification, and the contents of all such papers and documents are incorporated herein by reference.

It will be appreciated that various changes and modifications can be made to the present invention without departing from the scope of the present application.

What is claimed is:

1. A flat panel loudspeaker configured for mounting in an opening in a mounting surface, the flat panel loudspeaker comprising:

a planar resonant panel configured to be inserted into an opening in the mounting surface and having a front surface facing outward in the mounting surface when the flat panel loudspeaker is mounted in the mounting surface, wherein the planar resonant panel further comprises a rear surface opposite the front surface; and an exciter coupled to the rear surface of the planar resonant panel and configured to cause an active portion of the planar resonant panel to vibrate and generate sound in response to operation of the exciter;

wherein, when the planar resonant panel is mounted in the mounting surface and the exciter causes the planar resonant panel to vibrate and generate sound in response to the operation of the exciter, an outer boundary of the active portion of the planar resonant panel is fixed relative to the mounting surface, the outer boundary defining the active portion as an area of the planar resonant panel;

wherein the planar resonant panel comprises an edge portion extending beyond and entirely surrounding the outer boundary of the active portion in a plane of the planar resonant panel, the edge portion being configured to overlap the mounting surface when the flat panel loudspeaker is mounted in the opening in the mounting surface; and wherein the edge portion comprises a coupler directly coupled to the edge portion and coupled to the mounting surface when the flat panel loudspeaker is mounted in the opening in the mounting surface.

2. The flat panel loudspeaker of claim 1 wherein the edge portion is configured to couple to the mounting surface when the flat panel loudspeaker is mounted in the opening in the mounting surface, such that the outer boundary of the active portion of the planar resonant panel is fixed relative to the mounting surface.

3. The flat panel loudspeaker of claim 1 further comprising a support frame for mounting in the mounting surface and having the rear surface of the planar resonant panel fixed thereto around substantially an entirety of the outer boundary of the active portion the planar resonant panel, wherein when mounted in the mounting surface and when the planar resonant panel is caused by the exciter to vibrate on operation of the exciter, the outer boundary of the active portion of the planar resonant panel is fixed relative to the mounting surface; and wherein the edge portion of the planar resonant panel extends beyond the support frame in at least one direction in the plane of the planar resonant panel.

4. The flat panel loudspeaker of claim 3 wherein the planar resonant panel and the support frame are each substantially rectangular, each substantially triangular, or each substantially circular, and wherein the edge portion extends beyond an edge of the opening, beyond the outer boundary of the active portion, and beyond the support frame in at least one direction in the plane of the planar resonant panel.

5. The flat panel loudspeaker of claim 1 wherein the planar resonant panel is formed as a composite panel comprising the active portion and the edge portion as a continuous panel, the planar resonant panel comprising a plurality of layers including a first skin, a second skin, and a core arranged between the first skin and the second skin.

6. The flat panel loudspeaker of claim 5 further comprising a first adhesive layer between the first skin and the core and a second adhesive layer between the second skin and the core.

7. The flat panel loudspeaker of claim 1 wherein:

the edge portion comprises a rear surface facing toward the mounting surface when the flat panel loudspeaker is mounted in the mounting surface; and the rear surface of the edge portion comprises the coupler and the coupler comprises a clamp.

8. The flat panel loudspeaker of claim 1 wherein the coupler comprises a clamp.

9. The flat panel loudspeaker of claim 1 wherein:

the edge portion comprises a front surface facing outward in the mounting surface when the flat panel loudspeaker is mounted in the mounting surface; and the front surface of the edge portion is configured to bond with a wall coating applied to the mounting surface and the front surface of the planar resonant panel when the flat panel loudspeaker is mounted in the mounting surface to thereby support the flat panel loudspeaker in the mounting surface and to hide the flat panel loudspeaker from view.

10. The flat panel loudspeaker of claim 9 wherein the front surface of the edge portion is formed to have a rough surface so as to provide a surface to which the wall coating adheres.

11. The flat panel loudspeaker of claim 9 wherein the front surface of the edge portion comprises an outward facing paper skin layer provided on the front surface of the edge portion and adapted to bond with the wall coating.

12. The flat panel loudspeaker of claim 9 wherein the front surface of the edge portion comprises a primer coating adapted to bond with the wall coating.

13. The flat panel loudspeaker of claim 1 wherein the planar resonant panel comprises at least one of carbon fiber, a carbon-nanotube resin, layered glass, one or more synthetic fibers, or one or more natural fibers, or a substantially water-proof material.

14. The flat panel loudspeaker of claim 1 wherein the active portion of the planar resonant panel has a thickness of between approximately 0.3 mm and 3 mm, and wherein the edge portion has a thickness of between approximately 0.3 mm and 1 mm.

15. The flat panel loudspeaker of claim 1 wherein the flat panel loudspeaker is a distributed mode loudspeaker configured to produce sound by inducing distributed vibration modes in the planar resonant panel.

16. The flat panel loudspeaker of claim 1 wherein when the flat panel loudspeaker is mounted in the mounting surface, the edge portion of the planar resonant panel extends substantially parallel to the mounting surface and is sized such that in use, when a layer of wall coating is applied to the mounting surface and the edge portion, the edge portion becomes embedded within the layer of wall coating and is hidden from view.

17. The flat panel loudspeaker of claim 1 further comprising a mounting unit for mounting in the mounting surface and having the planar resonant panel and exciter joined therein.

18. The flat panel loudspeaker of claim 17 wherein a surface of the mounting unit has defined therein at least one hole arranged to facilitate sound to pass from within the mounting unit out of the flat panel loudspeaker to a mounting cavity positioned rearward of the mounting surface.

19. The flat panel loudspeaker of claim 17 further comprising a fastener extending from a rear surface of the mounting unit and configured to couple to an interior element of the mounting surface.

20. The flat panel loudspeaker of claim 1 wherein the coupler comprises one or more of adhesive, adhesive tape, or an opening engageable by a fastener to couple the edge portion to the mounting surface, wherein, if the coupler comprises adhesive, the adhesive is provided on the rear surface of the edge portion for coupling via bonding to the front surface of the mounting surface, and wherein, if the coupler comprises adhesive tape, the adhesive tape is provided on the rear surface of the edge portion for coupling via bonding to the front surface of the mounting surface.

* * * * *